United States Patent [19]
Naito et al.

[11] Patent Number: 5,228,043
[45] Date of Patent: Jul. 13, 1993

[54] DIRECT MODULATION PHASE SHIFT KEYING (DM-PSK) TRANSMISSION SYSTEM

[75] Inventors: Takao Naito, Kawasaki; Terumi Chikama, Tokyo; Shigeki Watanabe; Hideo Kuwahara, both of Kawasaki, all of Japan

[73] Assignee: Fujitsu Limited, Kawasaki, Japan

[21] Appl. No.: 730,265

[22] Filed: Jul. 15, 1991

[30] Foreign Application Priority Data

Jul. 18, 1990 [JP] Japan ............................. 2-187998

[51] Int. Cl.$^5$ .......................... H01S 3/10; H04B 10/00
[52] U.S. Cl. .................................... 372/32; 359/183; 359/187; 372/26
[58] Field of Search ................. 372/28, 29, 32, 26, 372/181; 359/182, 183, 187, 188, 191, 161

[56] References Cited

U.S. PATENT DOCUMENTS

| 4,805,235 | 2/1989 | Henmi ..................... 359/187 |
| 5,050,176 | 9/1991 | Naito et al. ................ 372/26 |
| 5,077,619 | 12/1991 | Toms ...................... 359/187 |

Primary Examiner—James W. Davie
Attorney, Agent, or Firm—Staas & Halsey

[57] ABSTRACT

A direct modulation phase shift keying transmission system (DM-PSK transmission system) is disclosed for coherent optical fiber transmission in which an injection current supplied to a semiconductor laser is adapted to be directly modulated. This system presents useful features in automatic frequency control, demodulation, and phase noise suppression.

17 Claims, 28 Drawing Sheets

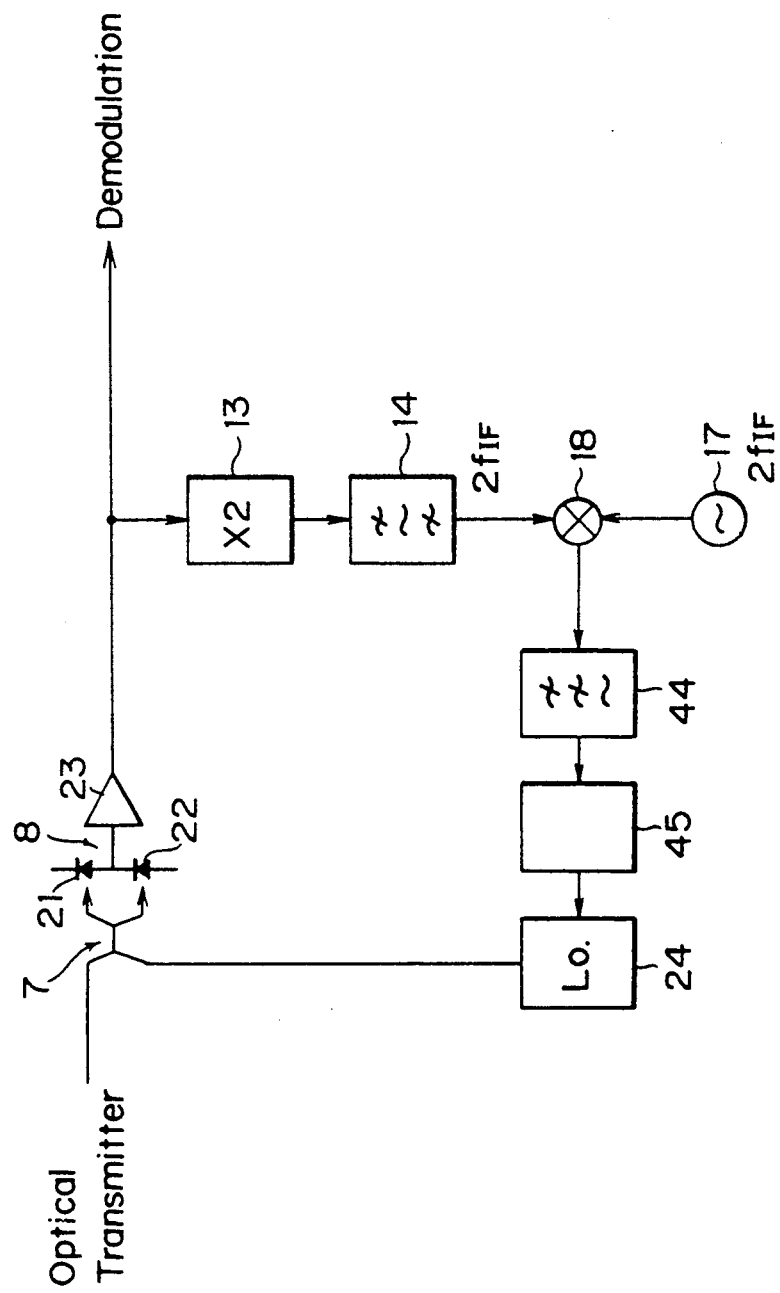

DIRECT MODULATION PHASE SHIFT KEYING (DM-PSK) TRANSMISSION SYSTEM

BACKGROUND OF THE INVENTION

1. Field of the Invention

The present invention generally relates to a direct modulation phase shift keying (DM-PSK) transmission system for coherent optical fiber transmission in which an injection current supplied to a semiconductor laser is directly modulated and, more particularly, to a DM-PSK transmission system presenting useful features in automatic frequency control, demodulation, and phase noise suppression.

An intensity modulation/direct detection (IM/DD) system in which intensity-modulated light is directly detected by a photodiode to be converted into an electrical signal is generally practiced today as one of the optical fiber transmission systems. On the other hand, to meet requirements for increased transmission capacity, increased transmission distance, etc., coherent optical fiber transmission systems are being earnestly studied. According to this system, coherent light from a semiconductor laser is used as the carrier, the carrier is modulated with its frequency, phase, etc. modified, and the light received by the receiver is mixed with local light so that heterodyne detection or homodyne detection is performed. Accordingly, a great enhancement in the reception sensitivity over that obtained in the IM/DD system can be achieved.

Further, since precise frequency selection can be achieved relatively easily after the optical detection has been performed, i.e., after the optical signal has been converted into an electrical signal, frequency-division multiplexing at a higher density becomes possible so that the transmission capacity of a single optical transmission line can be largely increased.

2. Description of the Related Art

A differential phase shift keying (DPSK) transmission system and a continuous phase frequency shift keying (CPFSK) transmission system are known as systems for having information to be transmitted carried by wave parameters of the light emitted from a semiconductor laser and suitable for high speed transmission.

A block diagram of the DPSK transmission system is shown in FIG. 26. On the transmitter side, reference numeral 201 denotes a transmission light source formed of a semiconductor laser oscillating at fixed amplitude and frequency and 202 denotes a phase modulator for modulating the phase of light from the transmission light source 201. In order that the demodulation by means of a one-bit delayed signal is performed on the receiver side, input data is previously modified on the transmitter side into a differential code by a differential coder 203 and the code is supplied to the phase modulator 202 through an amplifier 204. The light transmitted to the receiver side through an optical fiber 205 is combined in an optical coupler 206 with local light emitted from a local light source 207 formed of a semiconductor laser oscillating at fixed amplitude and frequency and the combined light is input to an optical detecting circuit 208 formed of a photodiode. When the combined light of the received signal light and the local light is input to the optical detecting circuit 208, an IF signal (intermediate-frequency signal) which carries the transmitted information in the form of phase shift, for example, is produced by virtue of the square law detection characteristic of the photodiode, and this IF signal is input to a demodulator 209. In the demodulator 209, the input IF signal is split into two portions, and one portion is delayed by a time corresponding to one bit (one time slot, i.e., the reciprocal of the bit rate) in a delay circuit 210 and mixed with the other intact portion of the IF signal in a mixer 211, and thereby, the transmitted information is regenerated. Since, demodulation is achieved in the DPSK transmission system through comparison of one signal with the other signal preceding it by one bit in the demodulator 209, the transmitter side when performing the phase modulation is required to apply differential coding to the input signal.

A block diagram of a CPFSK transmission system is shown in FIG. 27. On the transmitter side, reference numeral 221 denotes a transmission light source of which oscillation frequency is variable and 222 denotes a modulation circuit for modulating the oscillation frequency of the transmission light source 221. The modulation circuit 222 controls the shift amount of the oscillation frequency in accordance with the input signal such that the phase shift amount between different signs becomes over $\pi$. The light transmitted to the receiver side through an optical fiber 223 is combined with local light from a local light source 225 in an optical coupler 224 and then subjected to optical-electrical conversion in an optical detecting circuit 226. The IF signal produced through the conversion is input to a demodulator 227, wherein it is demodulated by being mixed with a signal a predetermined time $\tau$ delayed by a delay circuit 228. The delay time $\tau$ provided in the delay circuit 228 is dependent on the modulation index m. These parameters are in the following relationships.

$$\tau = T/2m, \quad m = \Delta F/B,$$

where T represents the time of one time slot, $\Delta F$ represents the frequency shift amount, and B represents the bit rate. Thus, in the CPFSK transmission system as described above, the transmitter side performs direct modulation of the frequency, not using an external modulator, and the receiver side detects the phase shift to thereby regenerate the transmitted information.

In the coherent optical fiber transmission systems of heterodyne detection type shown in FIG. 26 and FIG. 27, if the center frequency of the IF signal deviates from the established frequency, the demodulated waveform is distorted and the reception sensitivity is deteriorated. Therefore, it is preferred that automatic frequency control (AFC) is provided for the center frequency of the IF signal.

Automatic frequency control means of an asynchronous type applicable to the DPSK transmission system and CPFSK transmission system will be described with reference to FIG. 28. In this example, it is adapted such that the IF signal from the optical detecting circuit 208 (226) is split into two portions and one of which is converted into a voltage signal in a frequency-to-voltage conversion circuit 231, the voltage signal is converted into a current signal in a voltage-to-current conversion circuit 232, and this current signal is negatively fed back to the local oscillation light source 207 (225). Reference numeral 233 denotes a bandpass filter for cutting off undesired signals other than the IF signal produced by optical detection.

The asynchronous AFC is simple in the circuit configuration but has a demerit that its frequency controlling accuracy is low.

As for demodulators, there are those of synchronous type and asynchronous type. In case of polyphase PSK modulation and demodulation, for example, the synchronous type provides better reception sensitivity than the asynchronous type, and therefore, realization of synchronous demodulators are strongly desired, An example of a synchronous demodulator so far proposed is shown in FIG. 29. A detected signal from an optical detecting circuit 208 is passed through the bandpass filter 233, which has a passband ranging from the frequency $f_{IF}+B$ to the frequency $f_{IF}-B$, and then split into two paths, of which one is input to a mixer 264 and the other is input to a frequency doubler 261. The signal with the frequency $2f_{IF}$ passed through the frequency doubler 261 and a bandpass filter 262 is treated by a frequency halver 263 to have its frequency halved. When a phase modulated signal is treated so as to have its frequency doubled and then halved, the modulation component is removed therefrom and, hence, the carrier is regenerated. Then, by mixing this carrier and the IF signal having the modulation component intact in the mixer 264, synchronous demodulation is achieved. However, since it is difficult to realize a frequency halver 263 capable of securing a definite phase state, the synchronous demodulation is not easy to attain.

In coherent optical transmission systems, a semiconductor laser is usually used for the transmission light source or the local oscillation light source. Therefore, it is effective for improvement of the reception sensitivity to cope with difficulty of the phase noise produced therein. An example of phase noise suppression means so far proposed will be described below with reference to FIG. 30. The circuit shown is that disclosed in OFC '89 TU17. Light from a transmission light source 271 is split by a beam splitting circuit 272 and one of the split beams is subjected to phase modulation by a phase modulator 273. The other of the beams split by the beam splitting circuit 272 has its frequency shifted by $\Delta f$ in a frequency shifter 274. The beams from the phase modulator 273 and the frequency shifter 274 are combined in an optical coupling circuit 275 to be transmitted to the receiver side through an optical fiber 276. The light transmitted to the receiver side is combined with local light from a local oscillation light source 277 in an optical coupling circuit 278 and the combined light is input to an optical detecting circuit 279 to be converted into an electric signal. This signal is amplified by an amplifier 280 and then split into two paths, one of which is input to a bandpass filter 281 allowing the IF signal to pass therethrough and the other of which is input to a bandpass filter 282 allowing a signal with a frequency of $f_2$ ($=f_1+\Delta f$) therethrough. Here, $f_1$ represents the center frequency of the IF signal. The signals from the bandpass filters 281 and 282 are mixed in a mixer 283 and the transmitted information is regenerated through a demodulation circuit 284.

For reference, the spectrum of the signal input to the bandpass filter 281, 282 is shown in FIG. 31. Thus, by transmitting the carrier with its frequency shifted together with the signal light and, on the receiver side, having these signals mixed, the phase noise in the transmission light source can be suppressed.

SUMMARY OF THE INVENTION

An object of the present invention is to provide a DM-PSK transmission system capable of achieving highly precise automatic frequency control.

Another object of the present invention is to provide a DM-PSK transmission system capable of performing synchronous demodulation easily.

A further object of the present invention is to provide a DM-PSK transmission system capable of suppressing the phase noise easily.

According to an aspect of the present invention, there is provided a direct modulation phase shift keying transmission system outputting signal light by having a semiconductor laser, which outputs light whose frequency varies with an injection current supplied thereto, supplied with an injection current changed for a predetermined time period shorter than one time slot of an input signal coded by $2^n$-valued coding (n: a natural number) so that the integrated value of the frequency varied according to the change in the injection current may become a phase quantity of $2\pi k/2^n$ or $-2\pi k/2^n$ (k: any natural number smaller than $2^n$) comprising means for superposing a signal with the frequency corresponding to 1/n of the bit rate B of the input signal on the injection current supplied to the semiconductor laser and means for detecting a line spectrum signal whose frequency is different from the center frequency $f_{IF}$ of the intermediate-frequency signal, which is obtained by optical-electrical conversion of the signal light with local light added thereto, by the frequency corresponding to B/n and controlling the frequency of the local light so that the frequency of the line spectrum signal may become constant.

According to another aspect of the present invention, there is provided a direct modulation phase shift keying transmission system outputting signal light by having a semiconductor laser, which outputs light whose frequency varies with an injection current supplied thereto, supplied with an injection current changed for a predetermined time period shorter than one time slot of an input signal coded by binary coding so that the integrated value of the frequency varied according to the change in the injection current may become a phase quantity of $\pi$ or $-\pi$ comprising means for obtaining an intermediate-frequency signal by optical-electrical conversion of the signal light with local light added thereto, detecting a line spectrum signal generated when the intermediate-frequency signal is subjected to frequency conversion by a frequency doubler, and controlling the frequency of the local light so that the frequency of the line spectrum signal may become constant.

According to a further aspect of the present invention, there is provided a direct modulation phase shift keying transmission system outputting signal light by having a semiconductor laser, which outputs light whose frequency varies with an injection current supplied thereto, supplied with an injection current changed for a predetermined time period shorter than one time slot of an input signal coded by $2^n$-valued coding (n: a natural number) so that the integrated value of the frequency varied according to the change in the injection current may become a phase quantity of $2\pi k/2^n$ or $-2\pi k/2^n$ (k: any natural number smaller than $2^n$) comprising means for superposing a signal with the frequency corresponding to 1/n of the bit rate B of the input signal on the injection current supplied to the semiconductor laser and means for setting the frequency of the local light so that the center frequency $f_{IF}$ of the intermediate-frequency signal obtained by optical-electrical conversion of the signal light with local light added thereto may become approximately $2/n$ times the frequency corresponding to the bit rate B and detecting a line spectrum signal whose frequency is different from the center frequency $f_{IF}$ by the frequency corresponding to B/n, thereby regenerating the carrier in accordance with the line spectrum signal, and mixing the signal based on the carrier and the intermediate-frequency signal thereby achieving synchronous demodulation.

According to yet another aspect of the present invention, there is provided a direct modulation phase shift keying transmission system outputting signal light by having a semiconductor laser, which outputs light whose frequency varies with an injection current supplied thereto, supplied with an injection current changed for a predetermined time period shorter than one time slot of an input signal coded by $2^n$-valued coding (n: a natural number) so that the integrated value of the frequency varied according to the change in the injection current may become a phase quantity of $2\pi k/2^n$ or $-2\pi k/2^n$ (k: any natural number smaller than $2^n$) comprising means for superposing a signal with the frequency corresponding to 1/n of the bit rate B of the input signal on the injection current supplied to the semiconductor laser and means for detecting a line spectrum signal whose frequency is different from the center frequency $f_{IF}$ of the intermediate-frequency signal, which is obtained by optical-electrical conversion of the signal light with local light added thereto, by the frequency corresponding to B/n, and mixing the line spectrum signal and the intermediate-frequency signal, or mixing the line spectrum signal and the intermediate-frequency signal after converting the frequency of either or both of them to thereby achieving demodulation.

The above and other objects, features and advantages of the present invention and the manner of realizing them will become more apparent, and the invention itself will best be understood from a study of the following description and appended claims with reference had to the attached drawings showing some preferred embodiments of the invention.

BRIEF DESCRIPTION OF THE DRAWINGS

FIG. 11 is a block diagram of a further basic structure of the DM-PSK transmission system representing an embodiment of automatic frequency control means;

DESCRIPTION OF THE PREFERRED EMBODIMENTS

Figure 1:
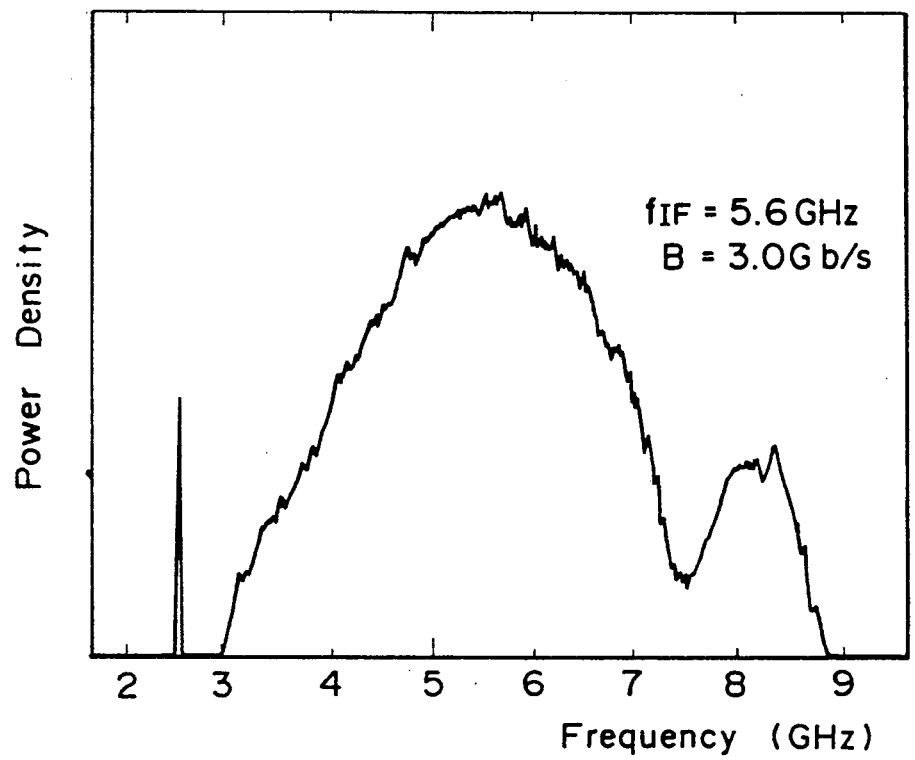
FIG. 1 is an explanatory diagram of a line spectrum observed in a DM-PSK transmission system.

Preferred embodiments of the present invention will be described below in detail with reference to the accompanying drawings. Throughout the drawings, like reference numerals denote corresponding objects.

Figure 2:
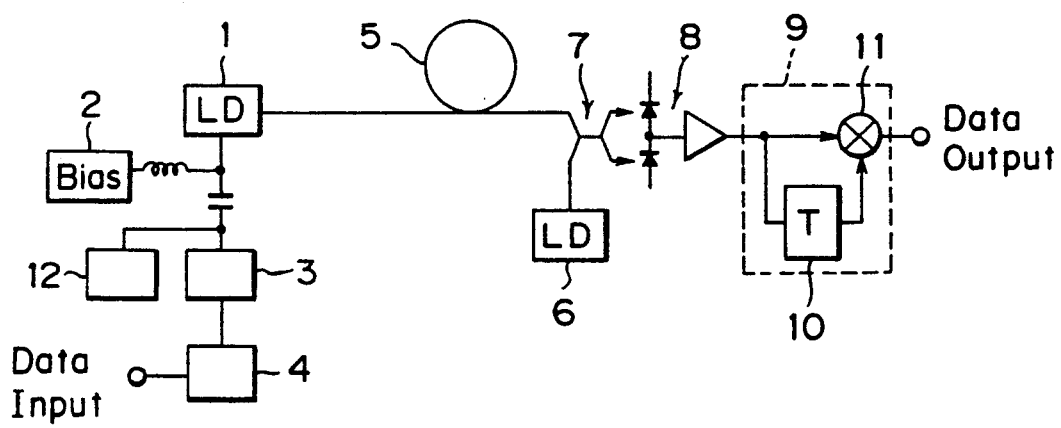
FIG. 2 is a block diagram of a DM-PSK system.

Earlier, we proposed a DM-PSK transmission system in which an injection current supplied to a semiconductor laser outputting light at the frequency corresponding to the injection current is changed for a predetermined period of time shorter than one time slot of a binary coded input signal and the signal light is output with the integrated value of the frequency, which is varied according to the change in the injection current, controlled to become a phase amount of $\pi$ or $-\pi$. An example of structure of the system is shown in FIG. 2. Reference numeral 1 denotes the semiconductor laser outputting light at the frequency corresponding to the injection current, 2 denotes a bias current circuit supplying a bias current to the semiconductor laser 1, 3 denotes a modulating current pulse circuit for superposing a modulating current pulse with a smaller pulse width than one time slot of a binary coded input signal on the bias current, and 4 denotes an amplitude and pulse width controlling circuit for controlling the amplitude and pulse width of the modulating current pulse based on the input signal so that the integrated value of the frequency varied by the modulating current pulse may become a phase amount of $\pi$ or $-\pi$. The modulated light is transmitted to the receiver side through an optical fiber (optical transmission line) 5 and it is combined with local light from a local oscillation semiconductor laser 6 in an optical coupler 7. The combined signal light and local light is converted by an optical detecting circuit 8 into an IF signal and it is demodulated by a demodulation circuit 9. The demodulation circuit 9 splits the input IF signal into two signals and one of which is delayed by one time slot T in a delay circuit 10. The thus delayed signal and the signal not delayed are adapted to be mixed in a mixer 11.

Figure 3A:
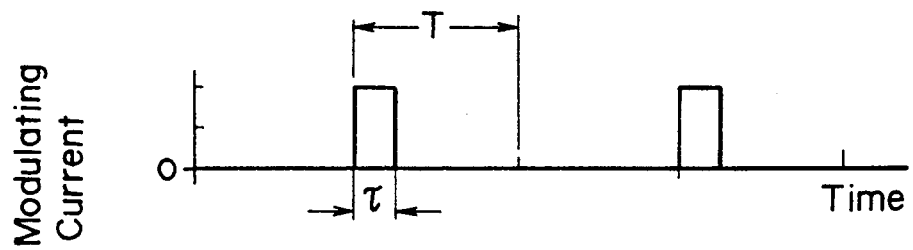
FIG. 3A to FIG. 3C are waveform diagrams of modulating current pulse, IF signal, and demodulated signal in a DM-PSK transmission system.
Figure 3B:
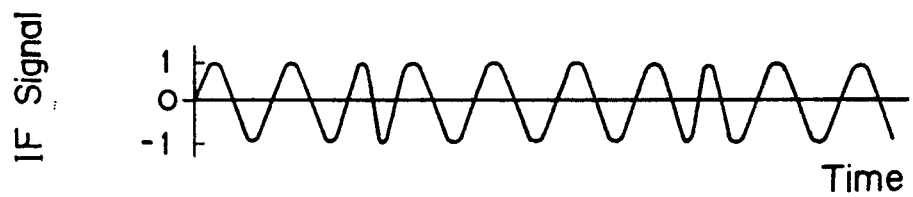
Figure 3C:
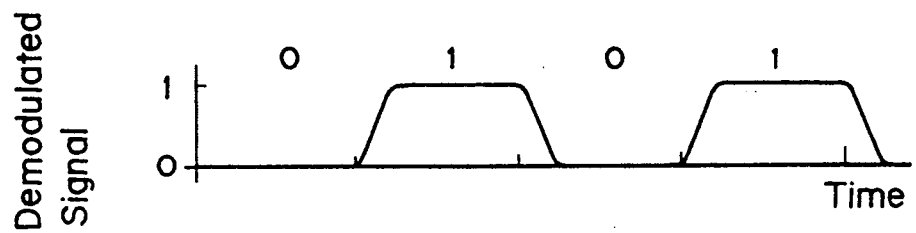
Figure 4:
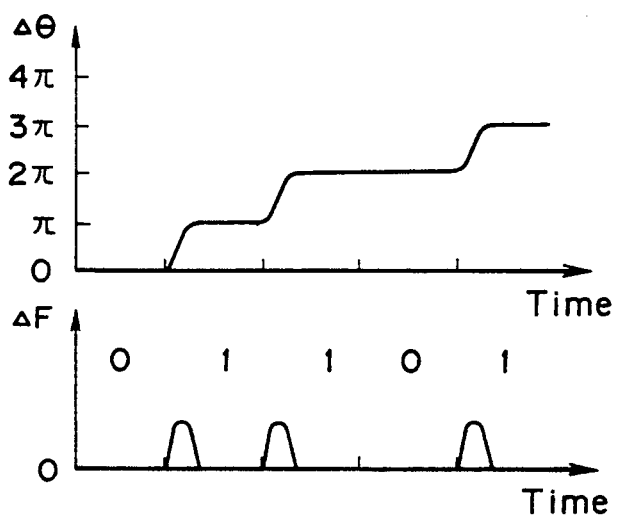
FIG. 4 is a timing chart showing frequency shift and phase variation in a DM-PSK system.

FIG. 3A to FIG. 3C are diagrams for explaining the operating principle of the DM-PSK transmission system, of which FIG. 3A shows the waveform of the modulating current pulse, FIG. 3B shows the waveform of the IF signal, and FIG. 3C shows the waveform of the demodulated signal. Incidentally, these waveforms are obtained when the modulation code is "0101". FIG. 4 shows graphs indicating variations with time of the frequency shift $\Delta F$ and the change in phase $\Delta \theta$. The modulation code in this case is "01101". As described above, it is adapted in the DM-PSK transmission system such that the oscillation frequency is shifted by $\Delta F$ for a predetermined period of time $\tau$ within one time slot T and thereafter the oscillation frequency is returned to the original frequency. The values of $\tau$ and $\Delta F$ are set up so that the phase shift may become $\pi$ or $-\pi$ after the time $\tau$ has passed. More specifically, $\tau$ and T are set so as to have mutual relation expressed as $\tau = T/2m$, where m represents the modulation index, which is defined, using the frequency shift $\Delta F$ and the bit rate B, as $m = \Delta F/B$.

Figure 5:
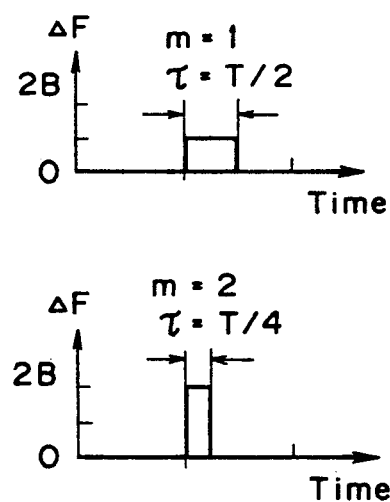
FIG. 5 is an explanatory diagram of examples of setting up of driving waveforms corresponding to modulation indexes in a DM-PSK system.

Examples of driving waveforms set up corresponding to the variation indexes are shown in FIG. 5. When $m=1$, $\tau = T/2$ and $\Delta F = B$, and when $m=2$, $\tau = T/4$ and $\Delta F = 2B$.

In the DM-PSK transmission system, neither external modulator nor differential coder is required and hence the structure of the transmission system can be simplified. Further, since the FM modulation characteristic of a semiconductor laser is over 10 GHz, a high-speed transmission can be achieved. Besides, since the system is less affected by wavelength dispersion of the optical fiber than the CPFSK transmission system, long-distance transmission can be achieved.

Through various experiments in the DM-PSK transmission system, the following fact was made known. That is, when a signal at the frequency equal to the bit rate B of an input signal was superposed on the injection current supplied to a semiconductor laser, we found a line spectrum appearing at the side of the spectrum of the IF signal as shown in FIG. 1. The axis of ordinates in FIG. 1 represents the power density and the axis of abscissas represents the frequency (GHz). In this experiment, the center frequency $f_{IF}$ of the IF signal was 5.6 GHz and the bit rate B was 3.0 GB/s. By conducting various experiments with the center frequency and the bit rate changed, it became clear that the line spectrum signal appears at the frequency differing from the center frequency $f_{IF}$ of the IF signal by the bit rate B of the input signal. FIG. 1 is a spectrum diagram where the line spectrum signal is appearing at the frequency $f_{IF} - B$. Whether the line spectrum signal appears at the frequency $f_{IF} - B$ or at the frequency $f_{IF} + B$ is determined according to which is the higher of the frequency of the signal light and the frequency of the local light.

In order to have the line spectrum signal produced, there is provided a circuit 12 as shown in FIG. 2 which superposes a current signal with the signal equivalent to the bit rate B of the input signal on the bias current.

In view of the fact that the line spectrum signal appears at the frequency in the specific relationship with the center frequency of the IF signal, it becomes possible to easily achieve automatic frequency control, demodulation, and phase noise suppression by making use of the line spectrum signal.

Figure 6:
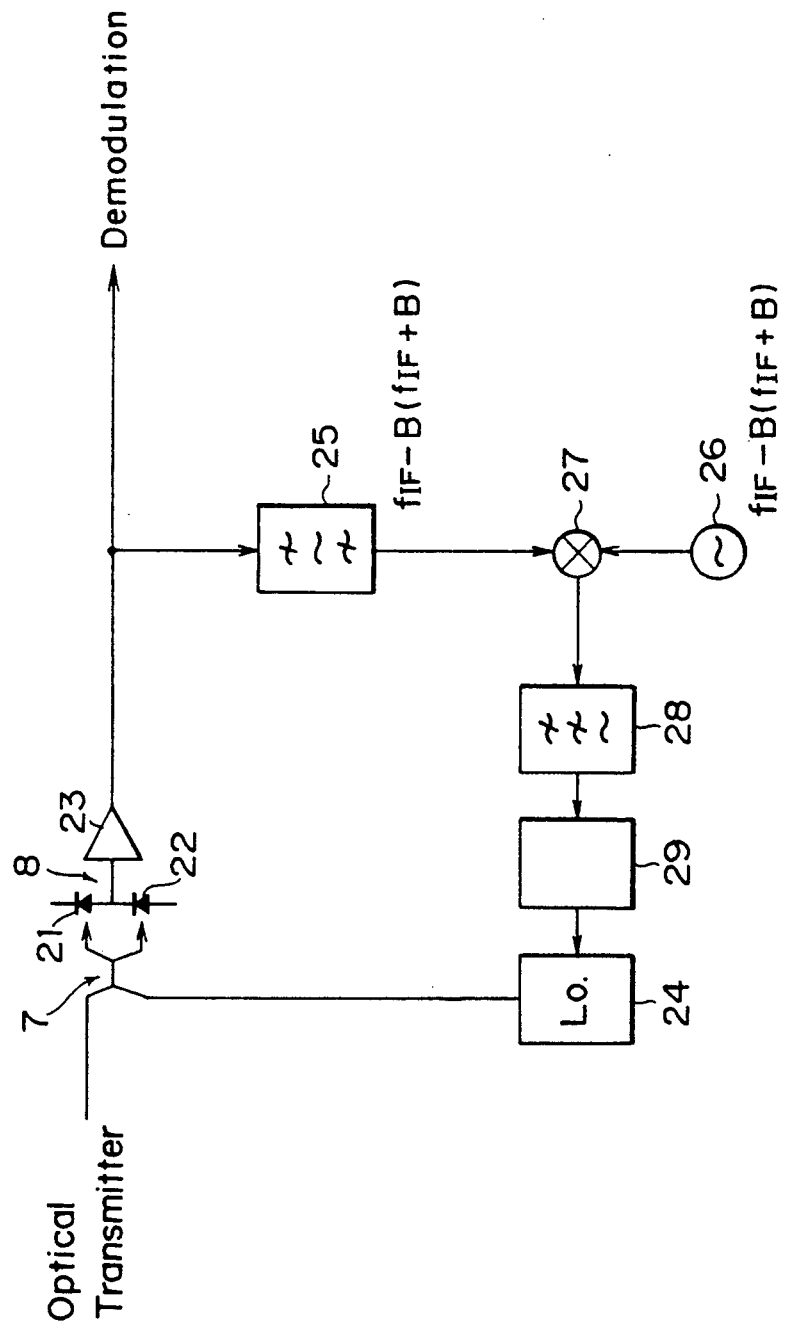
FIG. 6 is a block diagram of a basic structure of the DM-PSK transmission system representing an embodiment of automatic frequency control means.

FIG. 6 is a block diagram of a basic structure of the DM-PSK transmission system representing an embodiment of automatic frequency control means. Since the structure of the transmitter side of the system is the same as that of the system shown in FIG. 2, illustration and explanation of it will be omitted. Reference numeral 24 denotes a local oscillation semiconductor laser (local oscillation LD) outputting local light corresponding to an injection current. Reference numeral 7 denotes an optical coupler adding up the signal light from the optical transmitter and the local light from the local oscillation LD 24 and outputting the combined light. Reference numeral 8 denotes an optical detecting circuit performing optical-electrical conversion of the light form the optical coupler 7 thereby producing the IF signal. More particularly, the optical detecting circuit 8 is made up of photodiodes 21 and 22 of the same characteristics connected in series and an amplifier 23 amplifying the change in the potential at the junction point of the photodiodes 21 and 22. By the use of such optical detecting circuit of the so-called dual balance type, it becomes possible to improve the reception sensitivity coping with the difficulty of the intensity noise of the local oscillation LD 24. Reference numeral 25 denotes a narrow-band-pass filter which allows a line spectrum signal at the frequency $f_{IF} - B$ or $f_{IF} + B$ out of the signal from the optical detecting circuit 8 to pass therethrough. Reference numeral 26 denotes an oscillator oscillating at a frequency virtually equal to the frequency of the above described line spectrum signal. Reference numeral 27 denotes a mixer for mixing the signal from the oscillator 26 and the line spectrum signal from the narrow-band-pass filter 25 and outputting the mixed signal. Reference numeral 28 denotes a low-pass filter for allowing a lower frequency component of the output signal of the mixer 27 therethrough. Reference numeral 29 denotes a negative feedback circuit for performing voltage-to-current conversion of the output signal from the low-pass filter 28 thereby negatively feeding back the converted signal to the local oscillation LD 24 so that the frequency of the intermediate-frequency signal may be kept constant.

If the frequency of the line spectrum signal and the frequency of the signal from the oscillator 26 input to the mixer 27 are completely in agreement, then, a DC output proportional to the product of the amplitudes of the input signals is obtained from the mixer 27. When the frequency of the line spectrum signal varies, the level of the DC output also varies depending on the variation in the frequency of the line spectrum signal. If feedback is applied to cancel such variation, the frequency of the line spectrum signal can be maintained constant.

Since, in the present system, control is provided such that the frequency of the line spectrum signal is maintained constant, the center frequency of the IF signal having a specific relationship with the line spectrum signal can be maintained constant.

Figure 7:
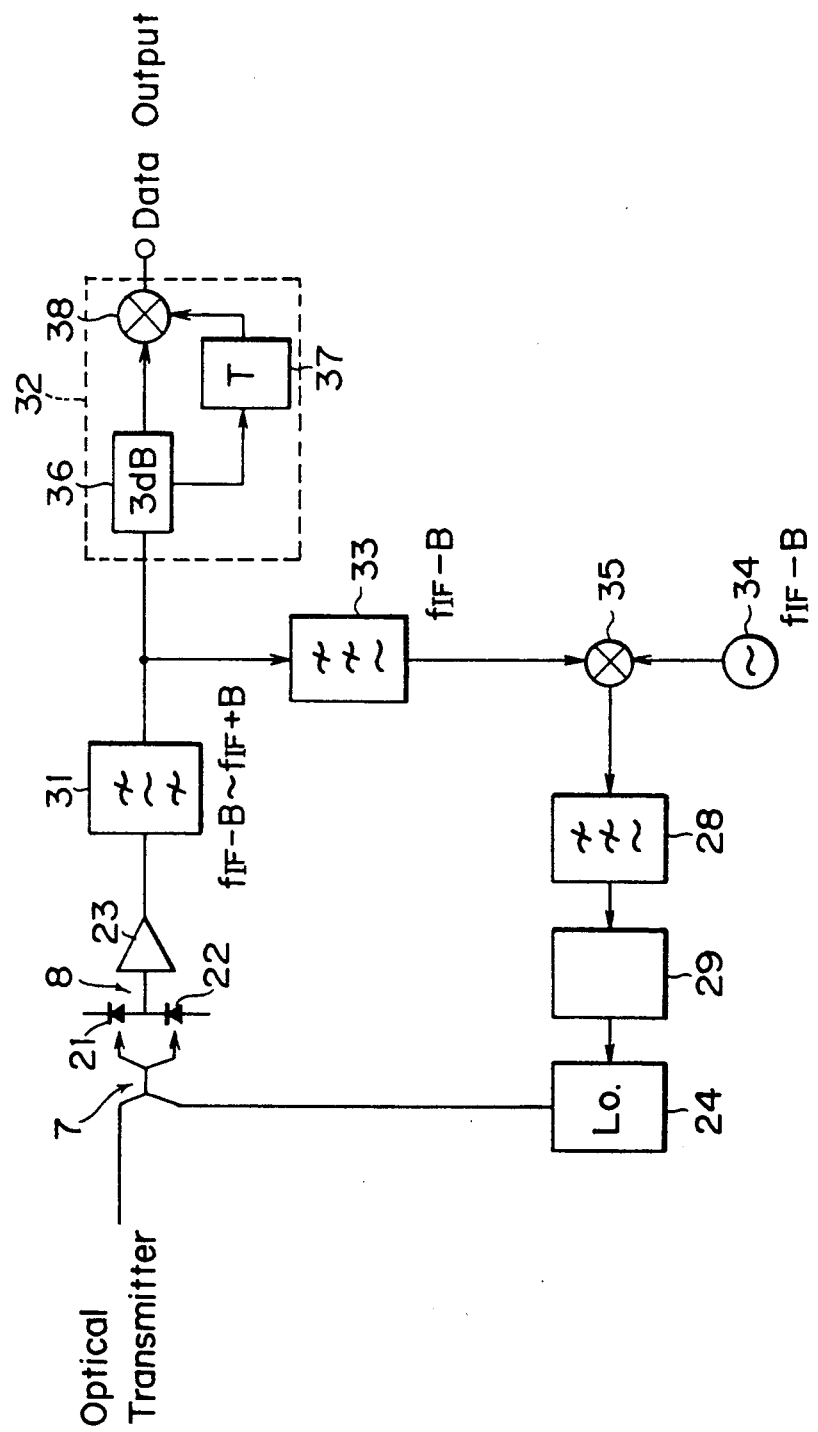
FIG. 7 is a block diagram of a particular example of the DM-PSK transmission system representing an embodiment of automatic frequency control means.

FIG. 7 is a block diagram of a particular example of the DM-PSK transmission system representing an embodiment of automatic frequency control means. In this example, as the optical coupler 7, optical detecting circuit 8, local oscillation LD 24, low-pass filter 28, and the negative feedback circuit 29, similar ones to those used in FIG. 6 are used. Reference numeral 31 denotes a bandpass filter allowing a signal within the frequency range from $f_{IF}-B$ to $f_{IF}+B$ out of the signal from the optical detecting circuit 8 to pass therethrough. Reference numeral 32 denotes a demodulation circuit performing demodulation in accordance with the signal from the bandpass filter 31. Reference numeral 33 denotes a low-pass filter allowing a line spectrum signal with the frequency $f_{IF}-B$ out of the signal from the bandpass filter 31 to pass therethrough. In the present example, the frequency of the local oscillation LD 24 is established such that the line spectrum signal appears at the lower frequency side of the spectrum of the intermediate-frequency signal. More specifically, the frequency of the local light is set to be lower than the frequency of the signal light. Accordingly, the line spectrum signal can be detected by the use of the low-pass filter 33 as described above. Reference numeral 34 denotes an oscillator oscillating at the frequency $f_{IF}-B$. Reference numeral 35 denotes a mixer for mixing the signal from the oscillator 34 and the line spectrum signal from the low-pass filter 33.

The demodulator 32 is made up of a 3 dB coupler 36 bisecting the input IF signal and outputting the bisected signals, a delay circuit 37 delaying one of the output signals of the 3 dB coupler 36 by a time corresponding to one time slot of the IF signal, and a mixer 38 for mixing the other of the output signals of the 3 dB coupler 36 and the output signal of the delay circuit 37. By the use of the demodulator of the described arrangement, demodulation is achieved through comparison of the phase of a signal with the phase of another signal preceding it by one bit. At this time, by virtue of the operating manner that is characteristic of the DM-PSK transmission system, the need for the differential coding circuit can be eliminated.

Figure 8:
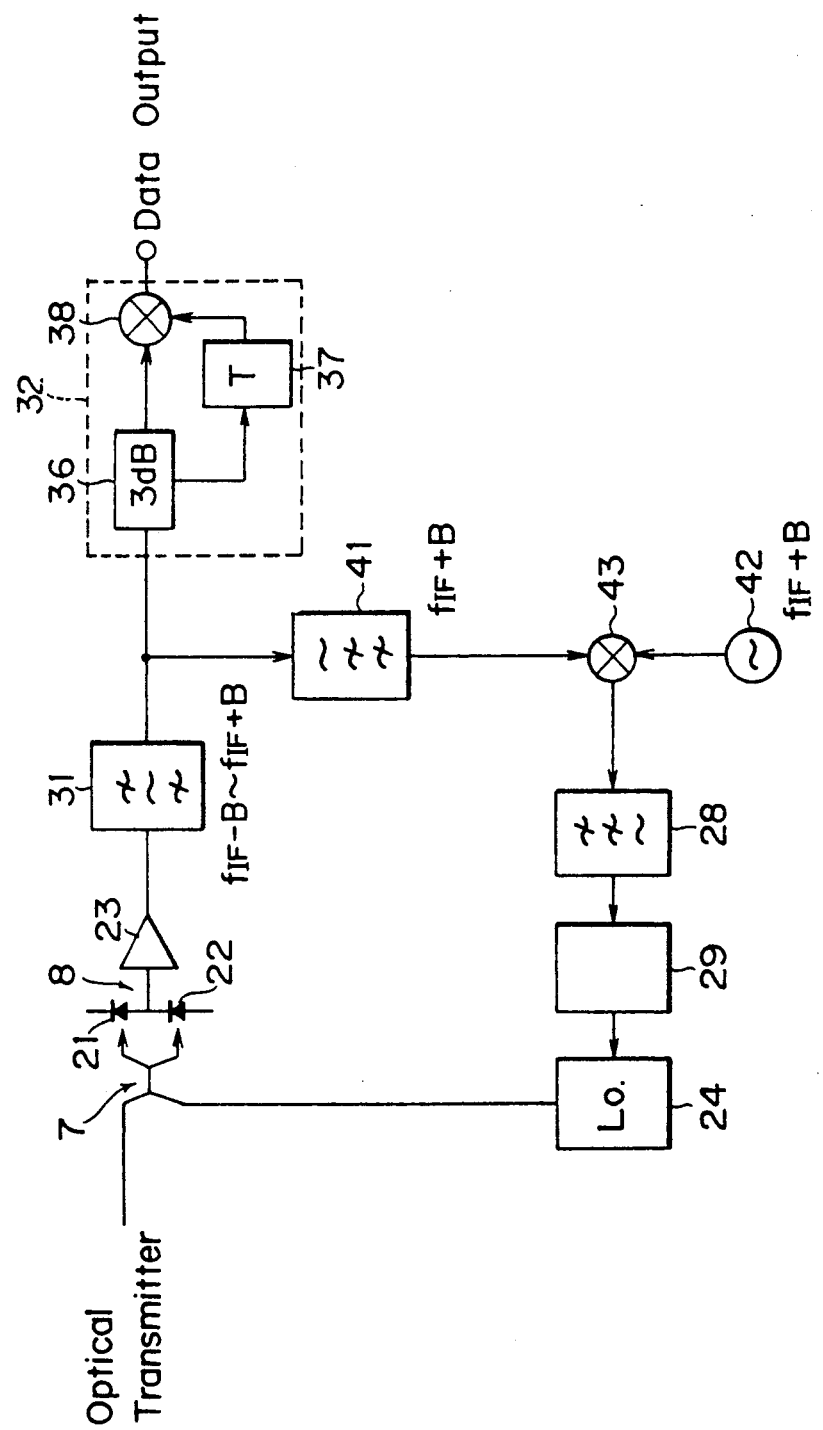
FIG. 8 is a block diagram of another particular example of the DM-PSK transmission system representing an embodiment of automatic frequency control means.

FIG. 8 is a block diagram of another particular example of the DM-PSK transmission system representing an embodiment of automatic frequency control means. In this example, the frequency of the local light is set up so that the line spectrum signal appears on the higher frequency side of the spectrum of the intermediate-frequency signal. Accordingly, in this example, a high-pass filter 41 is used for extracting the line spectrum signal. The high-pass filter 41 allows the line spectrum signal with the frequency $f_{IF}+B$ out of the signal from the optical detecting circuit 8 to pass therethrough. Reference numeral 42 denotes an oscillator oscillating at the corresponding frequency $f_{IF}+B$, and 43 denotes a mixer for mixing the signal from the oscillator 42 and the line spectrum signal from the high-pass filter 41.

According to the arrangements shown in FIG. 6, FIG. 7, or FIG. 8, the circuit for regenerating the carrier is not required and, hence, highly precise AFC can be achieved with a simple structure.

Figure 9:
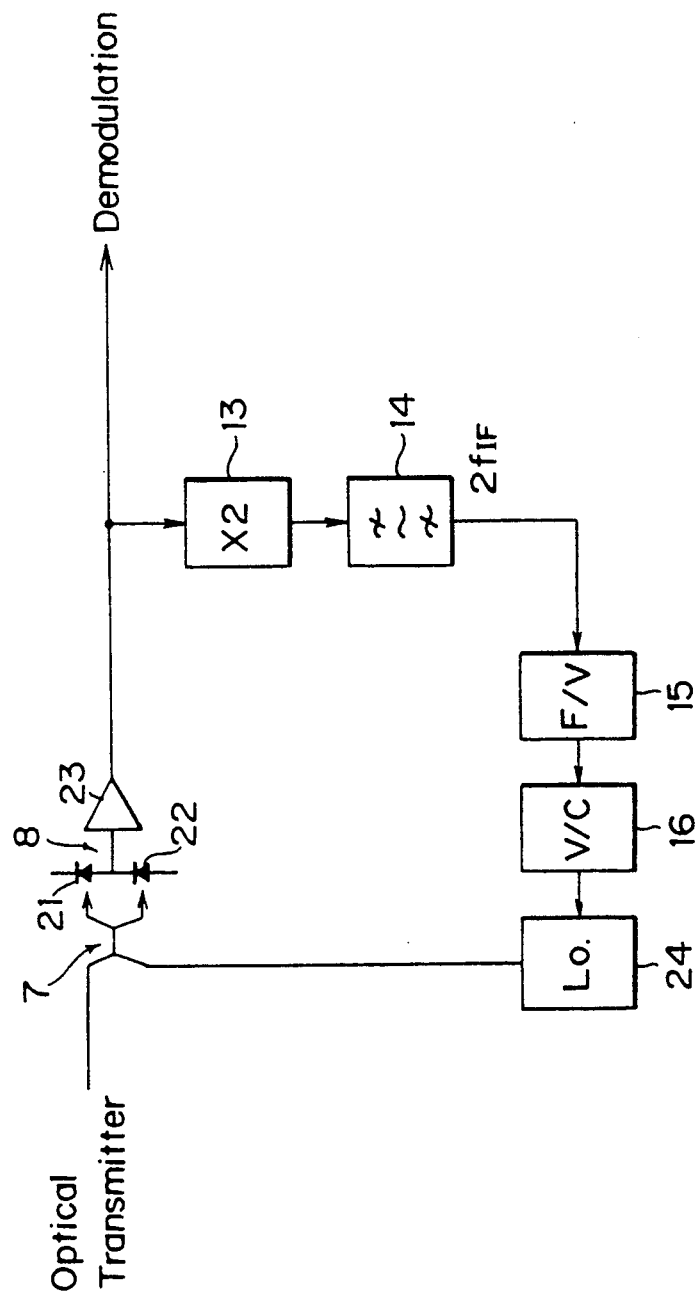
FIG. 9 is a block diagram of another basic structure of the DM-PSK transmission system representing an embodiment of automatic frequency control means.

FIG. 9 is a block diagram of another basic structure of the DM-PSK transmission system representing an embodiment of automatic frequency control means. The structure on the transmitter side of this system is similar to that shown in FIG. 2 but the circuit 12 (FIG. 2) for superposing the current signal with the frequency equivalent to the bit rate B of the input signal is not required. The optical coupler 7, optical detecting circuit 8, amplifier 23, and the local oscillation LD 24 are the same as those used in the foregoing. Reference numeral 13 denotes a frequency doubler which doubles the frequency of the IF signal and outputs this signal. Reference numeral 14 denotes a narrow-band-pass filter which allows line spectrum signal with the frequency $2f_{IF}$, $2(f_{IF}+\Delta F)$, or $2(f_{IF}-\Delta F)$ to pass therethrough. This line spectrum signal is converted by a frequency-to-voltage conversion circuit 15 into a voltage signal and, further, this voltage signal is converted by a voltage-to-current conversion circuit 16 into a current signal. Then, the local oscillation LD 24 is provided with negative feedback so that the aforesaid current signal may be maintained constant and the frequency of the local light is thereby maintained constant.

Figure 10A:
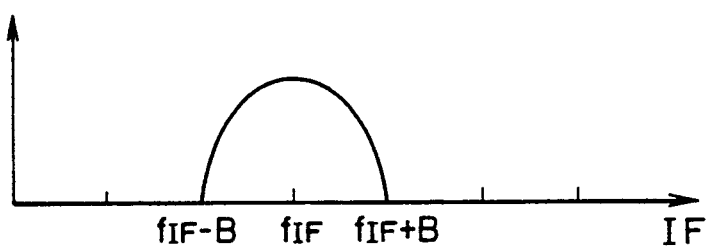
FIG. 10A and FIG. 10B are diagrams showing spectra of input signal and output signal of the frequency doubler shown in FIG. 9.
Figure 10B:
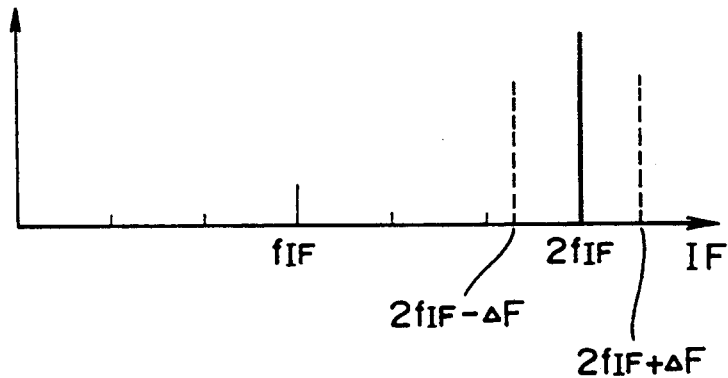

FIG. 10A shows the spectrum of the input signal to the frequency doubler 13 and FIG. 10B shown the spectrum of the output signal of the frequency doubler 13. Referring to these diagrams, it is known that the modulation component disappears when the frequency of the IF signal is doubled and that line spectrum signals appear at the frequency $2f_{IF}$ and the frequency $2(f_{IF}+\Delta F)$, or the frequency $2(f_{IF}-\Delta F)$. By detecting one of these line spectrum signals, the detected signal is used for negative feedback of the local light.

FIG. 11 is a block diagram of a further basic structure of the DM-PSK transmission system representing an embodiment of automatic frequency control means. Also in this embodiment, the superposition of the line spectrum signal on the transmitter side is not required. Reference numeral 17 denotes an oscillator oscillating at the frequency virtually equal to the frequency of the line spectrum signal from the narrow-band-pass filter 14. Reference numeral 18 denotes a mixer which mixes the signal from the oscillator 17 and the line spectrum signal from the narrow-band-pass filter 14 and outputs this mixed signal. Reference numeral 44 denotes a low-pass filter allowing a lower frequency component of the output signal of the mixer 18 to pass therethrough. Reference numeral 45 denotes a negative feedback circuit performing voltage-to-current conversion of the output signal of the low-pass filter 44 thereby providing negative feedback to the local oscillation LD 24 so that the frequency of the IF signal is maintained constant.

According to the embodiment shown in FIG. 9 or FIG. 11, since a frequency doubler is used on the receiver side to obtain a line spectrum signal as described above, it is not required to superpose a line spectrum signal on the transmitter side. Also according to these embodiments, highly precise automatic frequency control can be achieved.

Figure 12:
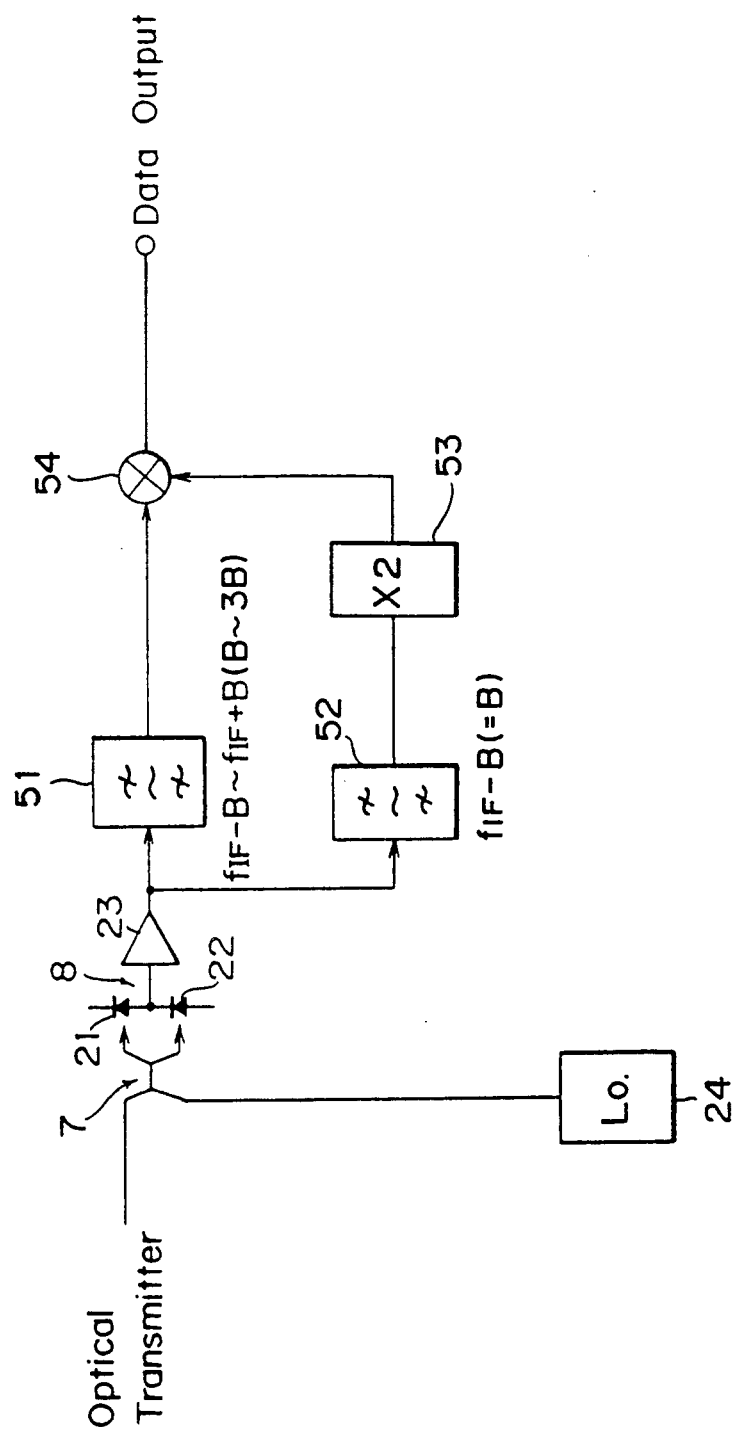
FIG. 12 is a block diagram of a basic structure of the DM-PSK transmission system representing an embodiment of demodulation means.

FIG. 12 is a block diagram of a basic structure of the DM-PSK transmission system representing an embodiment of demodulation means. As the optical coupler 7, optical detecting circuit 8, and local oscillation LD 24, similar ones to those used in the above described embodiments are used. The center frequency $f_{IF}$ of the IF signal is set to be double the frequency corresponding to the bit rate B. Reference numeral 51 denotes a bandpass filter which allows a signal within the range of the frequency from $f_{IF}-B$ to $f_{IF}+B$, i.e., from B to 3B, to pass therethrough. Reference numeral 52 denotes a narrow-band-pass filter allowing the line spectrum signal with the frequency $f_{IF}-B$ (=B) out of the signal from the optical detecting circuit 8 to pass therethrough. Reference numeral 53 denotes a frequency doubler for doubling the frequency of the signal from the narrow-band-pass filter 52. Reference numeral 54 denotes a mixer for mixing the signal from the bandpass filter 51 and the signal from the frequency doubler 53.

Since the center frequency of the IF signal is set to the value being double the frequency corresponding to the bit rate B, the frequency of the line spectrum signal agrees with the bit rate B. Accordingly, the carrier can be regenerated by doubling the frequency of the line spectrum signal be means of the frequency doubler 53. According to the carrier thus obtained, demodulation of the synchronous detection type can be achieved.

Figure 13:
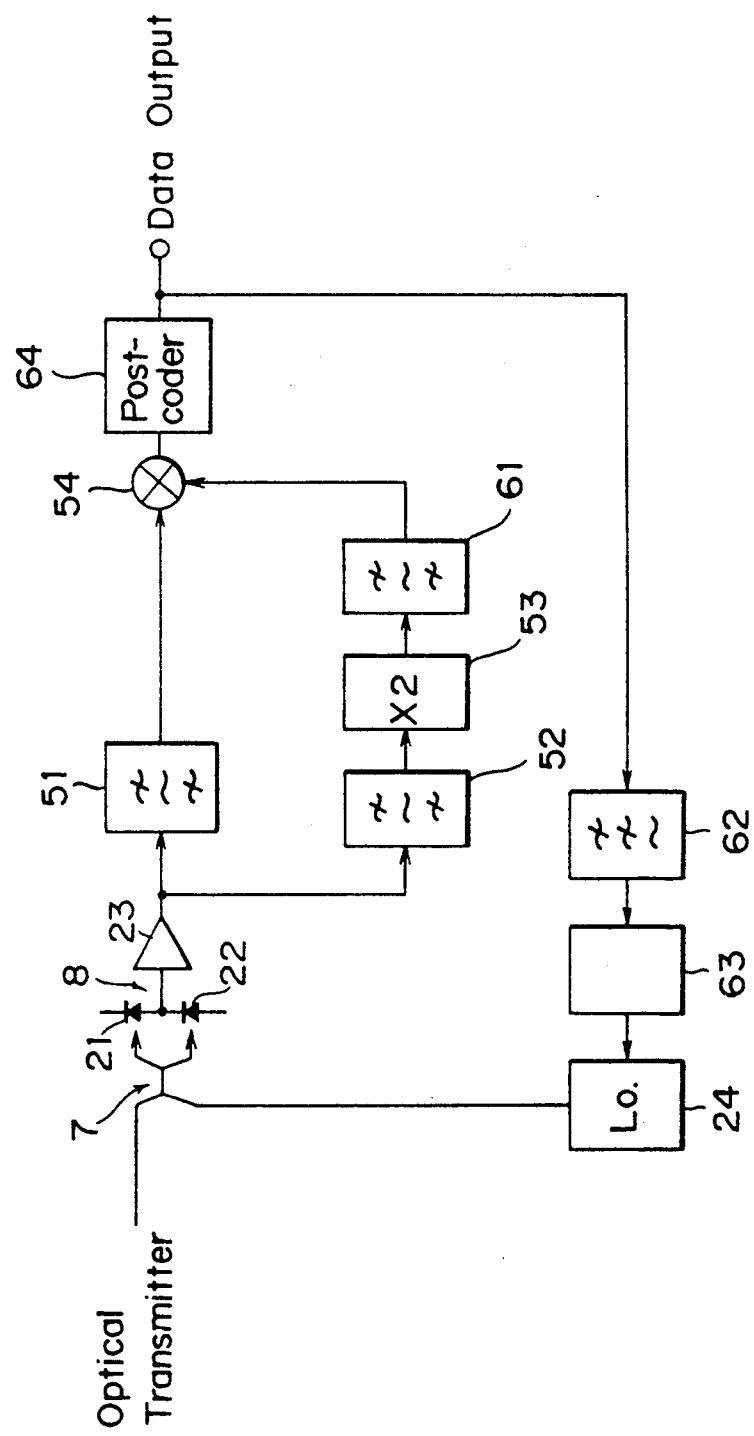
FIG. 13 is a block diagram of a particular example of the DM-PSK transmission system representing an embodiment of demodulation means.

FIG. 13 is a block diagram of a particular example of the DM-PSK transmission system representing an embodiment of demodulation means. In the present example, there is provided a bandpass filter 61 passing the signal with the frequency 2B therethrough and cutting off the signal other than that (for example, the residual signal of the frequency B) of the output signal of the frequency doubler 53. Further, there are provided a low-pass filter 62 and a negative feedback circuit 63 for executing feedback control according to the output signal of the mixer 54 for maintaining the center frequency of the IF signal. Reference numeral 64 denotes a postcoder, the operation of which will be described later.

In the DM-PSK transmission system, when one-bit delayed asynchronous demodulation is carried out as shown in FIG. 6 to FIG. 8, there is no need of coding, but when synchronous demodulation is carried out using the regenerated carrier, coding becomes necessary. To perform the coding, a precoder is provided on the transmitter side or a postcoder is provided on the receiver side.

Figure 14:
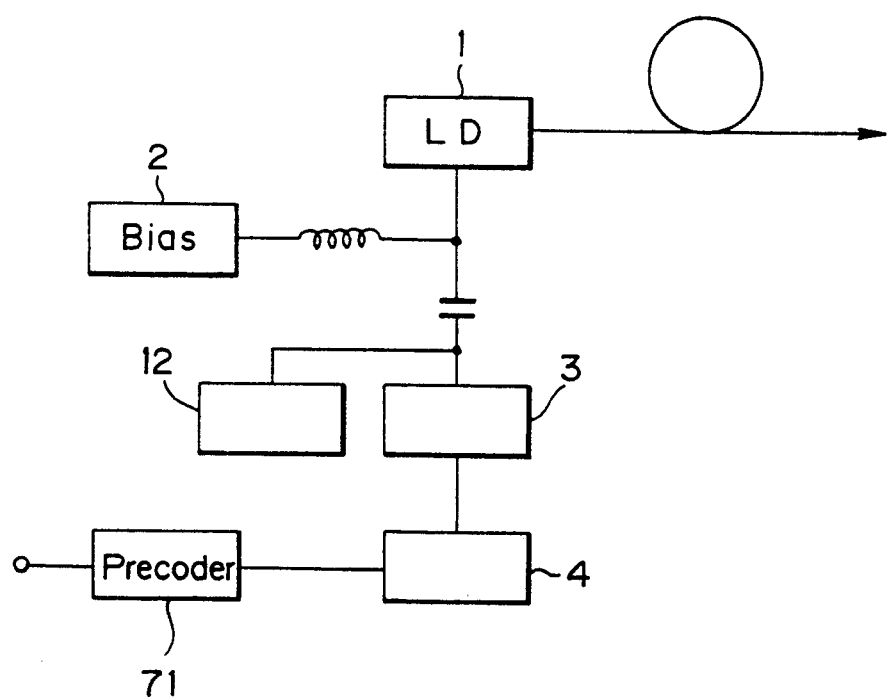
FIG. 14 is a block diagram of an optical transmitter including a precoder.

FIG. 14 is a block diagram showing an example of structure of an optical transmitter when the coding is performed, in which a precoder 71 is connected with the amplitude and pulse width controlling circuit 4. The input signal is input to the amplitude and pulse width controlling circuit 4 through the precoder 71.

The operation of the precoder 71 will now be described. The code will be represented by M(t). In the DM-PSK transmission system, the oscillation frequency of the laser diode for transmission is shifted for a predetermined period so that a phase shift is produced, and therefore, the phase of the signal increases or decreases by integer multiple of the phase $\pi$. Accordingly, when the same value continues in an information text m(t) to be transmitted, no frequency shift is provided and the phase is thereby held constant. That is, M(T) is set to M(t)=0. On the other hand, when the value of text m(t) is different from the value preceding it by one bit m(t−T), the phase is increased by $\pi$. That is, M(t) is set to M(t)=1. Hence, the coding is expressed as $$M(t) = m(t) + m(t-T).$$

A simple example of coding will be shown in the following table:

TABLE

| Information text | m(t) | 0 | 0 | 1 | 0 | 0 | 1 | 1 | 0 |
|---|---|---|---|---|---|---|---|---|---|
| | m(t − T) | | 0 | 0 | 1 | 0 | 0 | 1 | 1 |
| Coding | M(t) | | 0 | 1 | 1 | 0 | 1 | 0 | 1 |
| Phase shift | $\Delta\theta(t)$ | | 0 | $\pi$ | $2\pi$ | $2\pi$ | $3\pi$ | $3\pi$ | $4\pi$ |

The phase shift $\Delta\theta(t)$ being odd multiple of $\pi$ corresponds to "1" of the information text and the same being even multiple of $\pi$ corresponds to "0" of the information text.

When the postcoder is provided on the receiver side, coding can be made the same as in the case of providing the precoder on the transmitter side. More specifically, when synchronous modulation is carried out, the phase shift as it is corresponds to the low and high level at the time of demodulation. Therefore, the postcoding can be provided on the basis of the above mentioned numerical expression.

In the system shown in FIG. 12 or FIG. 13, the circuit for regenrating the carrier is not required and, hence, the structure of the apparatus can be simplified.

Figure 15:
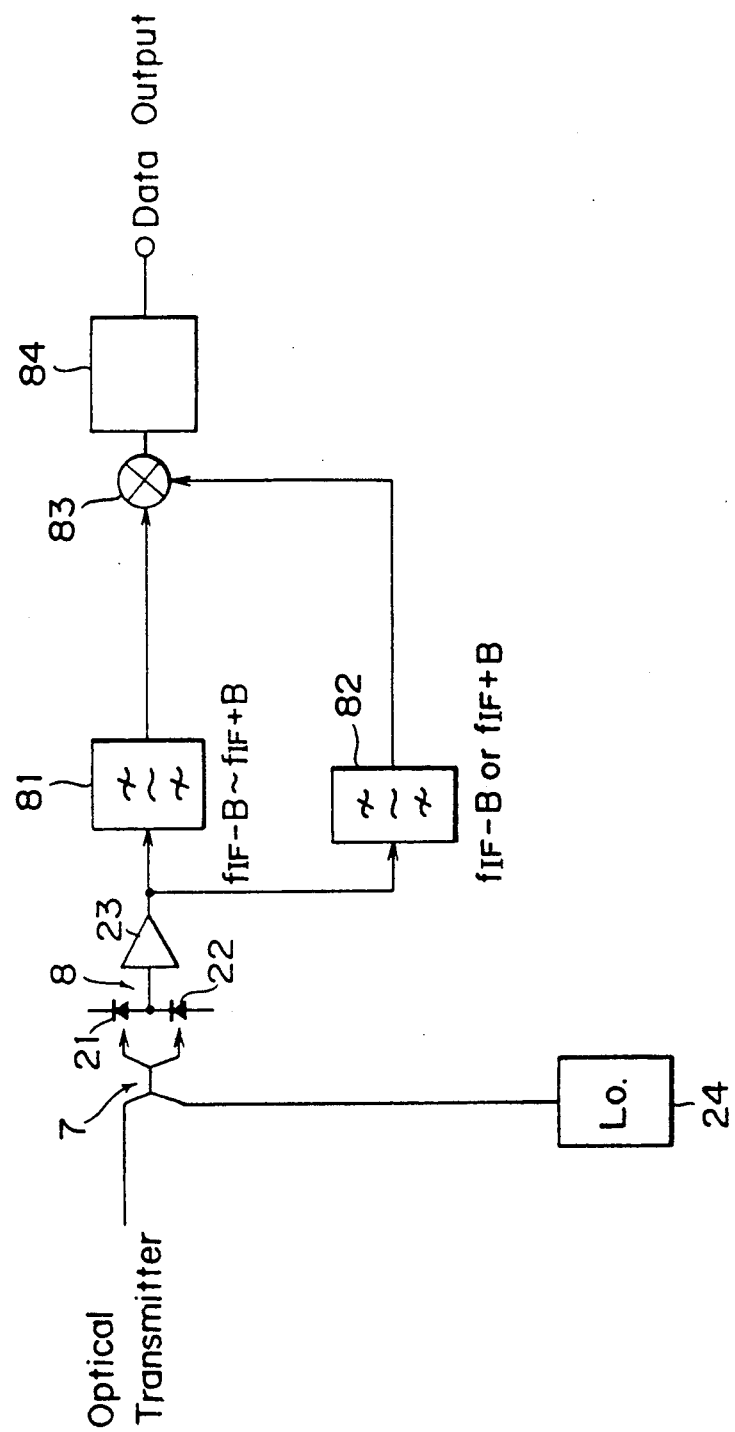
FIG. 15 is a block diagram of a basic structure of the DM-PSK transmission system representing an embodiment of phase noise suppression means.

FIG. 15 is a block diagram of a basic structure of the DM-PSK transmission system representing an embodiment of phase noise suppression means. As the optical coupler 7, optical detecting circuit 8, and local oscillation LD 24, similar ones to those used in the foregoing examples are used. Reference numeral 81 denotes a bandpass filter which allows the signal within the range of frequency from $f_{IF}-B$ to $f_{IF}+B$ out of the signal from the optical detecting circuit 8 to pass therethrough. Reference numeral 82 denotes a narrow-band-pass filter passing the line spectrum signal with the frequency $f_{IF}-B$ or $f_{IF}+B$ out of the signal from the optical detecting circuit 8 therethrough. Reference numeral 83 denotes a mixer for mixing the signal from the bandpass filter 81 and the signal from the narrow-band-pass filter 82. Reference numeral 84 denotes a demodulation circuit performing demodulation according to the signal from the mixer 83.

According to the above described arrangement, the signal from the bandpass filter 81 and the signal from the narrow-band-pass filter 82 are ones based on the light from the semiconductor laser for transmission at the same timing. Therefore, by mixing these signals, the phase noise produced by the semiconductor laser for transmission can be canceled.

Figure 16:
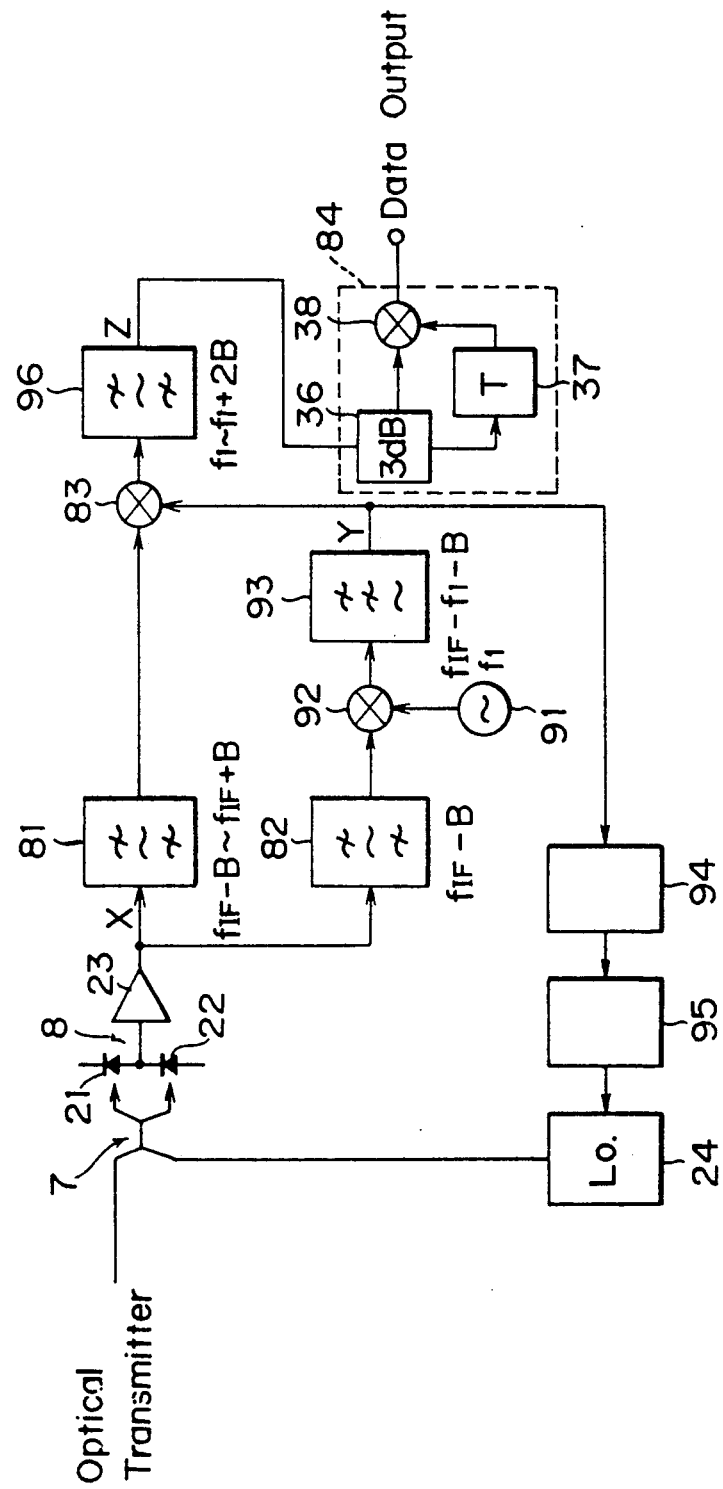
FIG. 16 is a block diagram of a particular example of the DM-PSK transmission system representing an embodiment of phase noise suppression means.

FIG. 16 is a block diagram of a particular example of the DM-PSK transmission system representing an embodiment of phase noise suppression means. In this example, it is adapted such that the line spectrum signal from the narrow-band-pass filter 82 is downconverted to be input to the mixer 83. More specifically, the signal from the narrow-band-pass filter 82 is mixed with a signal from an oscillator 91 having a frequency of $f_1$ in a mixer 92, whereby the frequency of the line spectrum signal $f_{IF}-B$ is down converted to $f_{IF}-F_1-B$, and this signal is input to the mixer 83 through a low-pass filter 93. Further, there is provided a bandpass filter 96 having a passband ranging from the frequency $f_1$ to $f_1+2B$ in the path between the mixer 83 and the demodulation circuit 84. The demodulation circuit 84, similarly to the demodulation circuit 32 shown in FIG. 7 and FIG. 8, is made up of a 3dB coupler 36, a delay circuit 37, and a mixer 38. Reference numeral 94 denotes a frequency-to-voltage conversion circuit which receives the branch signal of the signal output from the narrow-band-pass filter 82 to be input to the mixer 83 and applies frequency-to-voltage conversion to the received signal. Reference numeral 95 denotes a negative feedback circuit applying voltage-to-current conversion to the output signal from the frequency-to-voltage conversion circuit 94 for providing negative feedback to the local oscillation LD 24.

Figure 17A:
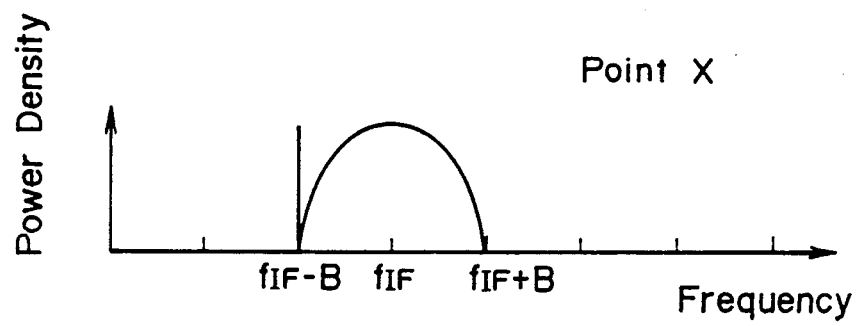
FIG. 17A to FIG. 17C are diagrams showing spectra of signals at various points in FIG. 16.
Figure 17B:
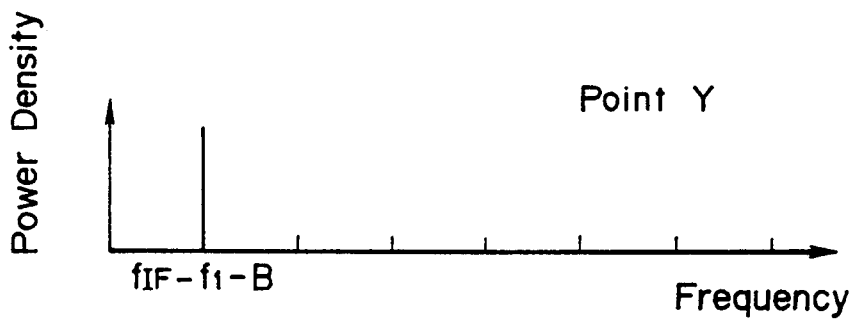
Figure 17C:
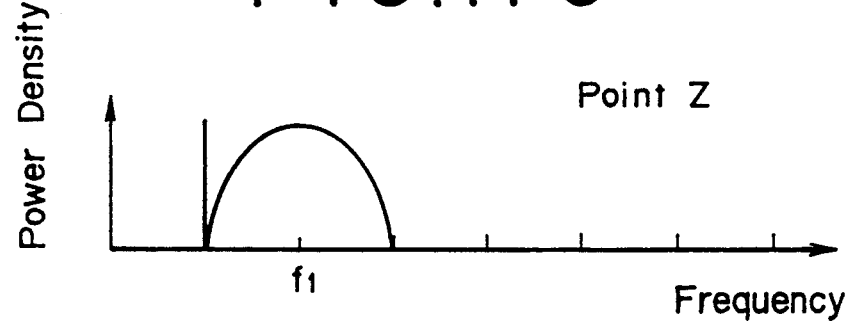

FIG. 17A to FIG. 17C are diagrams showing spectra of signals at the points X, Y, and Z in FIG. 16. The spectrum in FIG. 17A is that at the output point X of the optical detecting circuit 8, the spectrum in FIG. 17B is that at the output point Y of the low-pass filter 93, and the spectrum in FIG. 17C is that at the output point Z of the bandpass filter 96. As apparent from the spectra shown in FIGS. 17A to 17C, by downconverting the line spectrum signal and mixing it with the IF signal, it is achieved to have the center frequency of the signal input to the demodulation circuit 84 set to $f_1$, whereby folding of spectrum which might occur if the downconverting of the line spectrum signal is not carried out can be prevented.

Figure 18:
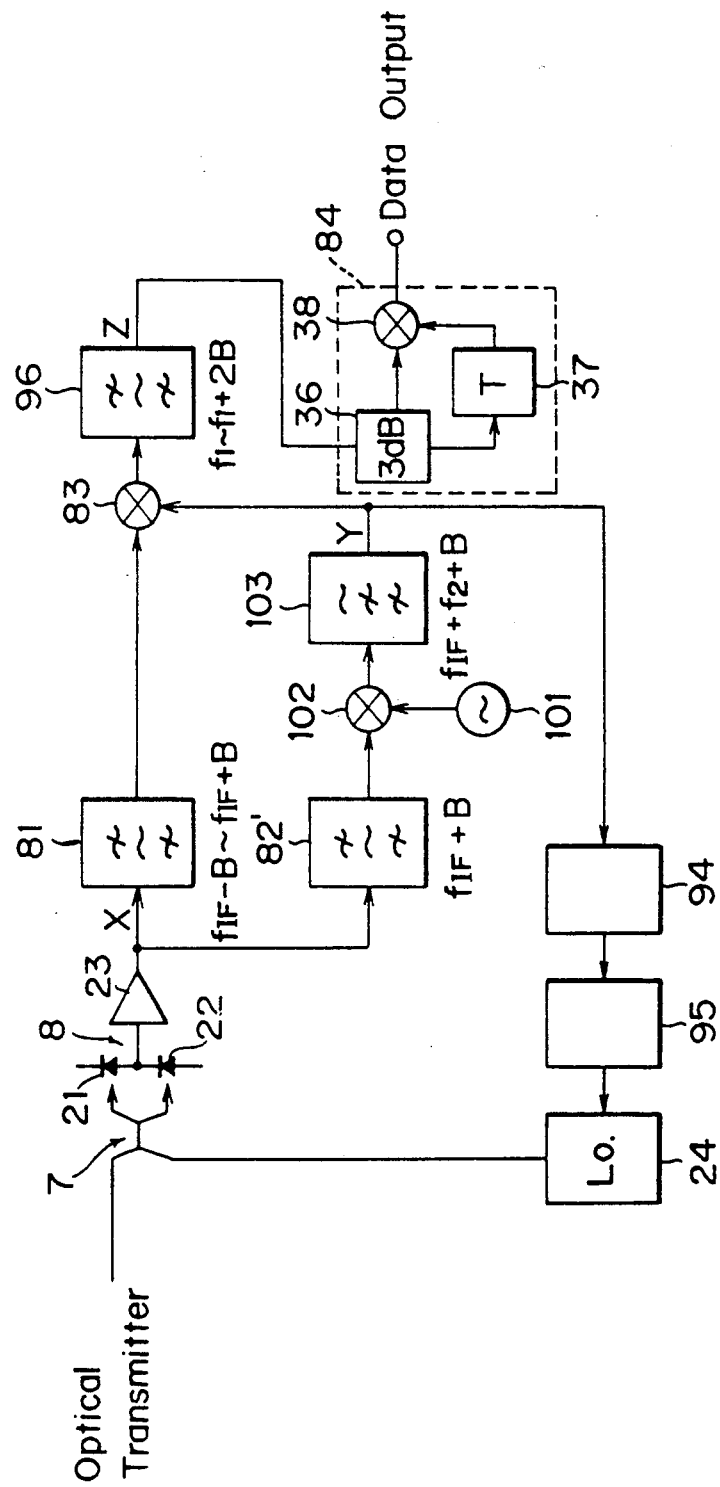
FIG. 18 is a block diagram of another particular example of the DM-PSK transmission system representing an embodiment of phase noise suppression means.

FIG. 18 is a block diagram of another particular example of the DM-PSK transmission system representing an embodiment of phase noise suppression means. This example is that of the case where the line spectrum signal appears on the higher frequency side of the spectrum of the IF signal. In this case, a narrow-band-pass filter 82' allowing the line spectrum signal with the frequency $f_{IF}+B$ to pass therethrough is used and the output signal from this filter is upconverted before being input to the mixer 83. Reference numeral 101 denotes an oscillator generating a signal with a frequency of $f_2$, 102 denotes a mixer for mixing the signal from the narrow-band-pass filter 82' and the signal from the oscillator 101, and 103 denotes a high-pass filter allowing the upconverted line spectrum signal having the frequency $f_{IF}+f_2+B$ to pass therethrough.

Figure 19A:
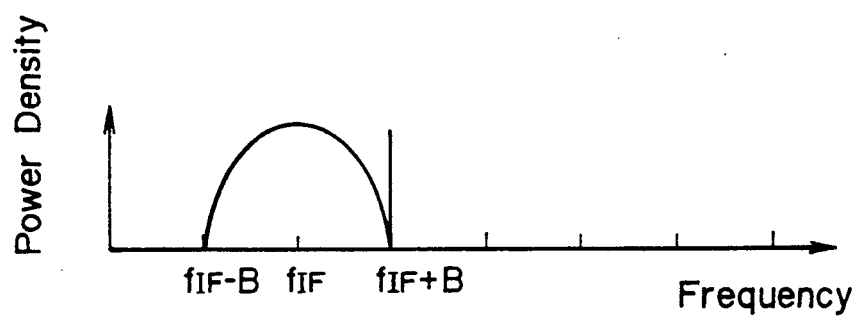
FIG. 19A to FIG. 19C are diagrams showing spectra of signals at various points in FIG. 18.
Figure 19B:
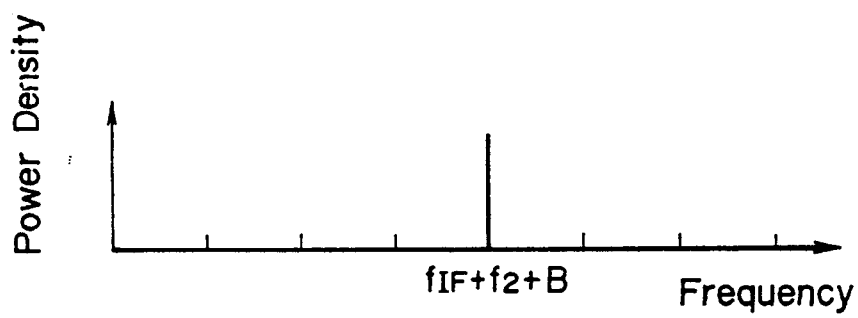
Figure 19C:
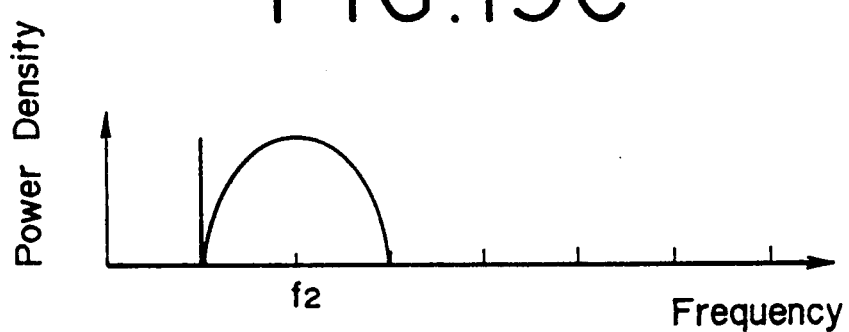

FIG. 19A to FIG. 19C are diagrams showing spectra of signals at the points X, Y, and Z in FIG. 18. The spectrum in FIG. 19A is that at the output point X of the optical detecting circuit 8, the spectrum in FIG. 19B is that at the output point Y of the high-pass filter 103, and the spectrum in FIG. 19C is that at the output point Z of the bandpass filter 96. Also in this example, it is achieved to have the center frequency of the signal input to the demodulation circuit 84 set to $f_2$, and thereby, the spectrum can be prevented from being folded. Whether the line spectrum is to be upconverted or downconverted can be determined according to the position on the frequency axis where the line spectrum signal appears or the quantity of frequency converting.

Figure 20:
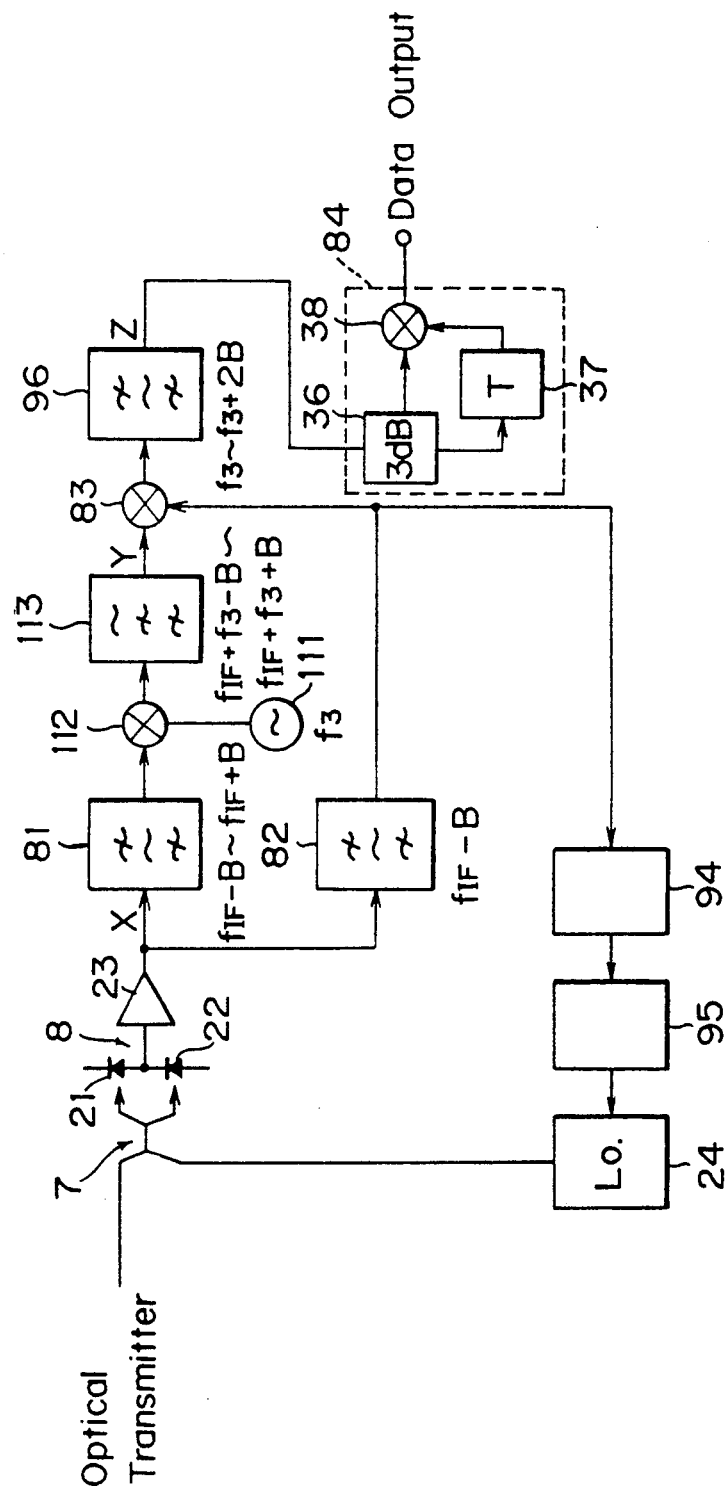
FIG. 20 is a block diagram of a further particular example of the DM-PSK transmission system representing an embodiment of phase noise suppression means.

FIG. 20 is a block diagram of a further particular example of the DM-PSK transmission system representing an example of phase noise suppression means. In this example, to prevent folding of the spectrum of the signal input to the demodulation circuit 84, the frequency of the signal from the narrow-band-pass filter 82 is not converted, but the frequency of the signal from the bandpass filter 81 is converted, before being input to the mixer 83. Reference numeral 111 denotes an oscillator oscillating at a frequency of $f_3$, 112 denotes a mixer for mixing the signal from the bandpass filter 81 and the signal from the oscillator 111, and 113 denotes a high-pass filter allowing the intermediate-frequency signal and line spectrum signal existing in the frequency range from $f_{IF}+f_3-B$ to $f_{IF}+f_3+B$ to pass therethrough.

Figure 21A:
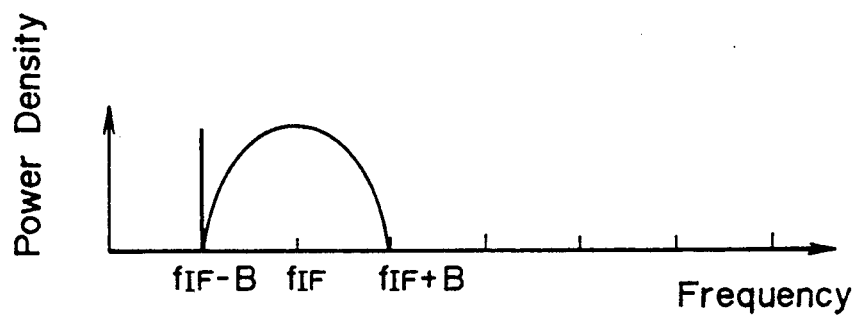
FIG. 21A to FIG. 21C are diagrams showing spectra of signals at various points in FIG. 20.
Figure 21B:
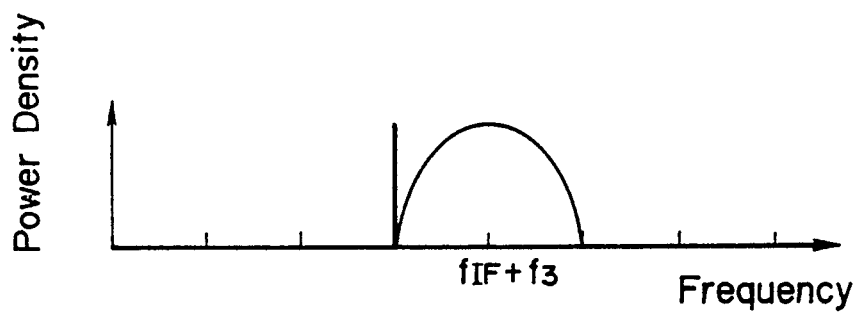
Figure 21C:
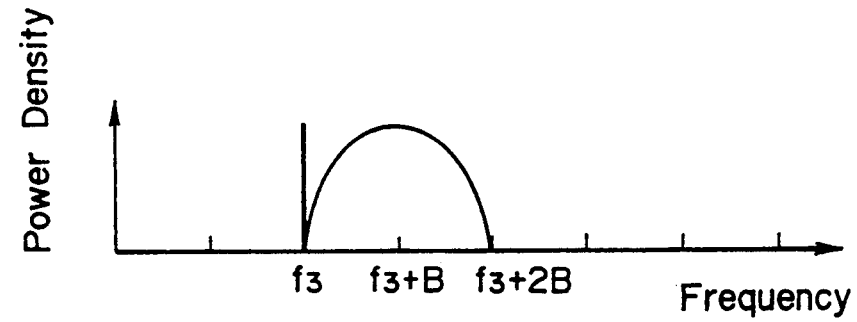

FIG. 21A to FIG. 21C are diagrams showing spectra of signals at the points X, Y, and Z in FIG. 20. The spectrum in FIG. 21A is that at the output point X of the optical detecting circuit 8, the spectrum in FIG. 21B is that at the output point Y of the high-pass filter 113, and the spectrum in FIG. 21C is that at the output point Z of the bandpass filter 96. Also in this example, it is achieved to have the center frequency of the signal input to the demodulation circuit 84 set to $f_3+B$, and thereby, folding of the spectrum can be effectively prevented.

By modifying the systems which have been supporting binary modulation in the foregoing description, systems adapted to many-valued modulation can be obtained.

Figure 22:
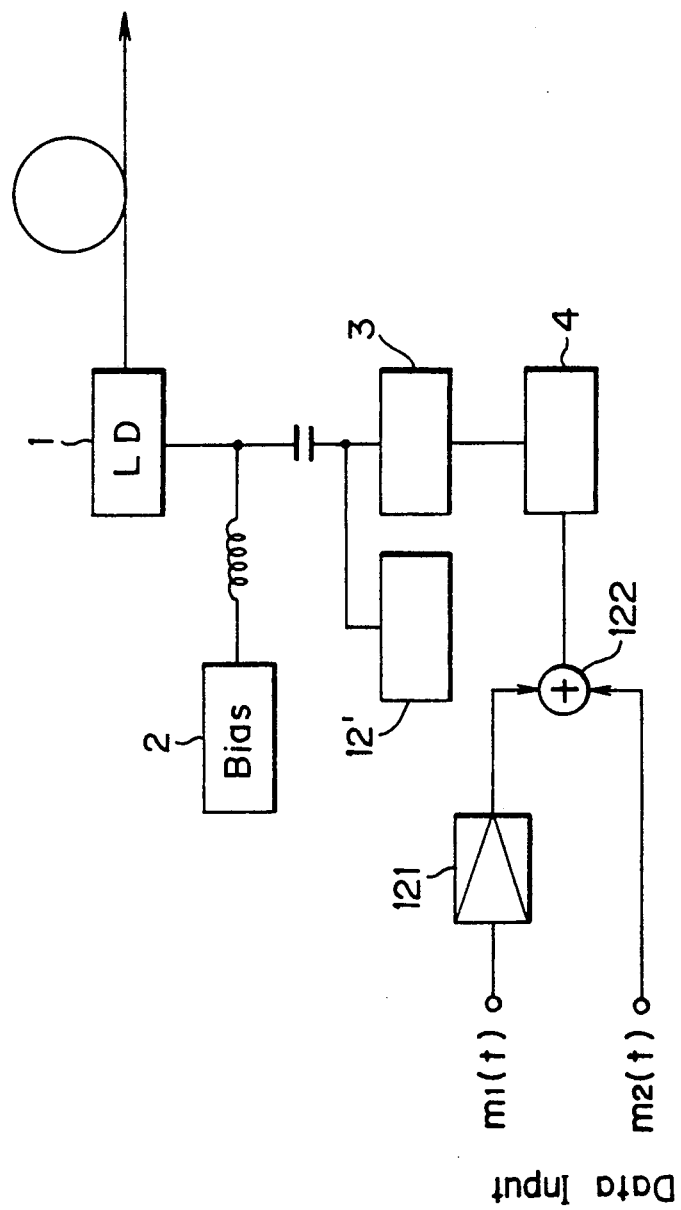
FIG. 22 is a block diagram of an example of structure of an optical transmitter in the case of four-valued modulation.

FIG. 22 is a block diagram showing an example of structure of an optical transmitter for use in four-valued modulation. In this example, input data $m_1(t)$ and $m_2(t)$ through two channels are added together in an adder 122 after the amplitude of the former has been doubled in an amplifier 121, and the added signal is input to the amplitude and pulse width controlling circuit 4. Reference numeral 12' denotes a circuit for superposing a signal with the frequency equal to $\frac{1}{2}$ (generally, $1/n$ in the case of $2^n$-valued modulation) of the frequency corresponding to the bit rate B of the input signal.

According to the described arrangement, waveforms of modulating current pulses can be controlled such that the first state of the four-valued states indicated by the input data is subjected to no frequency shift, and the second to fourth states are respectively subjected to phase shifts of $2\pi k/4$ ($k=1, 2, 3$) with respect to the first state. More particularly, when the phase state corresponding to the one of the four-valued signals is 0, the phase states of the remaining three respectively become $\pi/2$, $\pi$, and $3\pi/2$.

Figure 23:
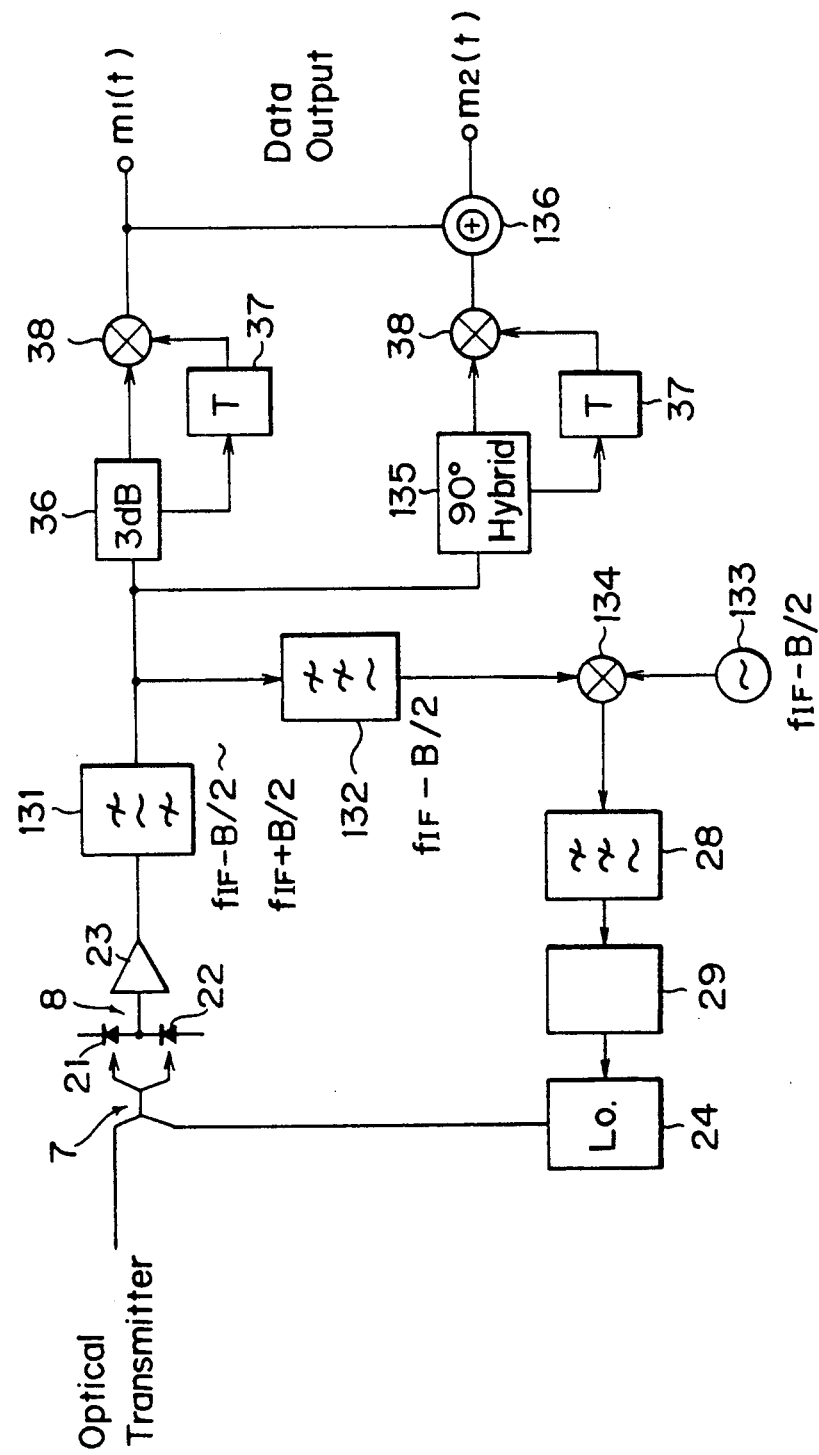
FIG. 23 is a block diagram of the DM-PSK transmission system representing an embodiment of automatic frequency control means in the case of four-valued modulation.

FIG. 23 is a block diagram of the DM-PSK transmission system representing an embodiment of automatic frequency control means in the case of four-valued modulation. In this example, the AFC loop is structured similarly to that shown in FIG. 7. In many-valued modulation inclusive of the four-valued modulation, the expansion of the spectrum of the IF signal with respect to the bit rate is different from that in the case of the binary modulation. Therefore, it is preferred that a filter coping with that is designed. Reference numeral 131 denotes a bandpass filter allowing a signal within the frequency range from $f_{IF}-B/2$ to $f_{IF}+B/2$ out of the signal from the optical detecting circuit 8 to pass therethrough. Reference numeral 132 denotes a low-pass filter allowing a line spectrum signal with the frequency $f_{IF}-B/2$ to pass therethrough. Reference numeral 133 denotes an oscillator oscillating at the frequency $f_{IF}-B/2$. Reference numeral 134 denotes a mixer for mixing the signal from the low-pass filter 132 and the signal from the oscillator 133. Here, it is adapted such that negative feedback control of the local oscillation LD 24 is performed according to the output signal of the mixer 134. The demodulation circuit includes two sets of demodulation circuits as shown in FIG. 7 and it is adapted such that a demodulated signal is output therefrom through an exclusive logical sum circuit (exclusive OR/NOR circuit) 136. However, instead of one of the 3 dB couplers, a 90° hybrid coupler 135 providing bisected outputs with a phase difference of 90° therebetween is used. When the line spectrum signal appears on the higher frequency side of the spectrum of the IF signal, the frequency which the narrow-band-pass filter 132 passes therethrough and frequency oscillated by the oscillator 133 are set to $f_{IF}+B/2$.

Figure 24:
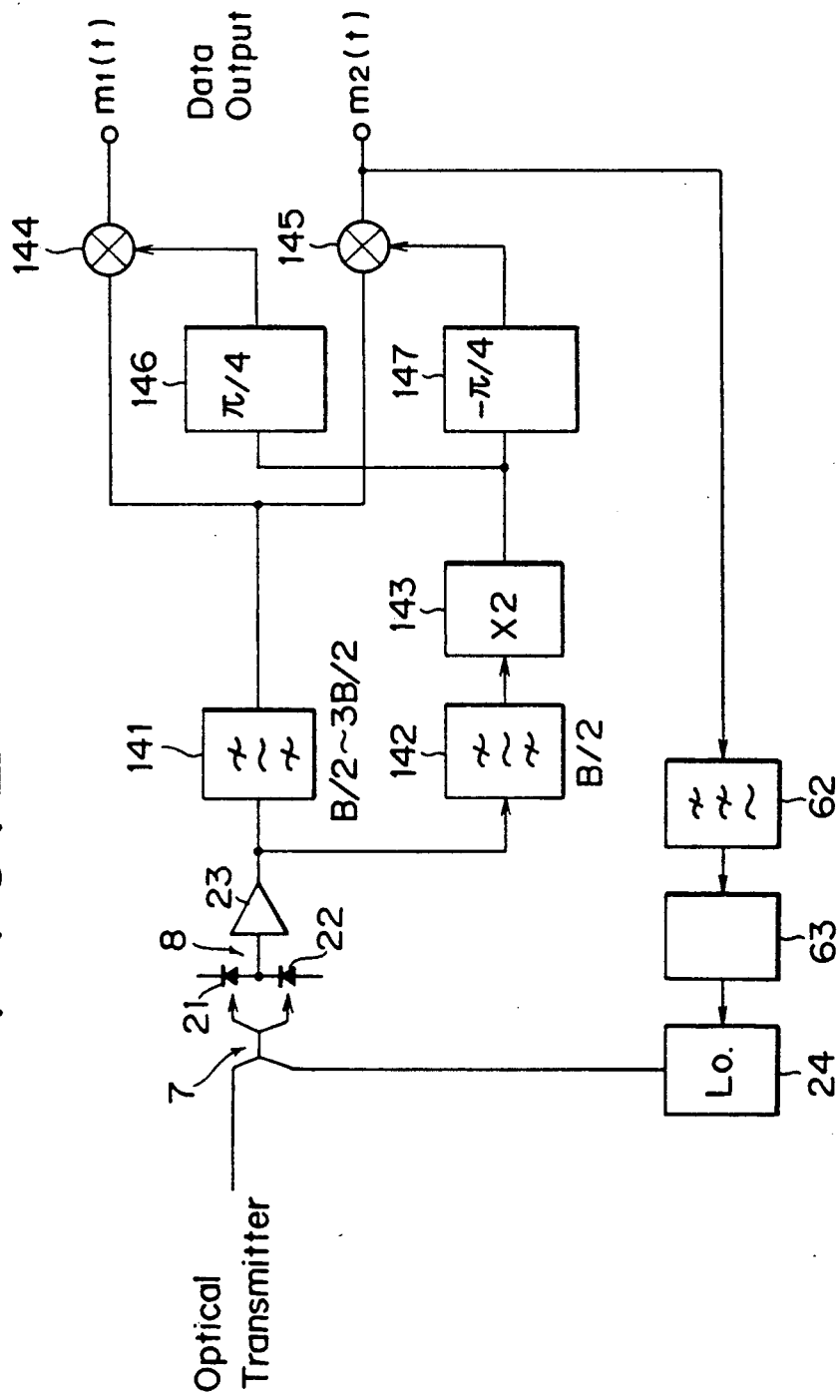
FIG. 24 is a block diagram of the DM-PSK transmission system representing an embodiment of demodulation means in the case of four-valued modulation.

FIG. 24 is a block diagram of the DM-PSK transmission system representing an embodiment of demodulation means in the case of four-valued modulation. What is different in this case from the case of the binary demodulation is that the passband of the bandpass filter 141 receiving one branch of the signal from the optical detecting circuit 8 ranges from B/2 to 3B/2 and the frequency of the signal which the narrow-band-pass filter 142, receiving the other branch of the signal, passes therethrough is B/2. The output signal of the bandpass filter 141 is divided and the divided signals are input to mixers 144 and 145. The output signal of the narrow-band-pass filter 142 has its frequency doubled by a frequency doubler 143 and is then divided into two signals, which are respectively input to mixers 144 and 145 through a $\pi/4$-phase shifter 146 and a $-\pi/4$-phase shifter 147. Outputs of the mixers 144 and 145 become demodulated outputs. Further, for performing automatic frequency control of the local oscillation LD 24, a branch signal from either of the output signals from the mixers 144 and 145 (from the mixer 145 in the present example) is negatively fed back to the local oscillation LD 24 through the low-pass filter 62 and negative feedback circuit 63. In the present case, the center frequency $f_{IF}$ of the IF signal is set to be equal to the bit rate B.

Figure 25:
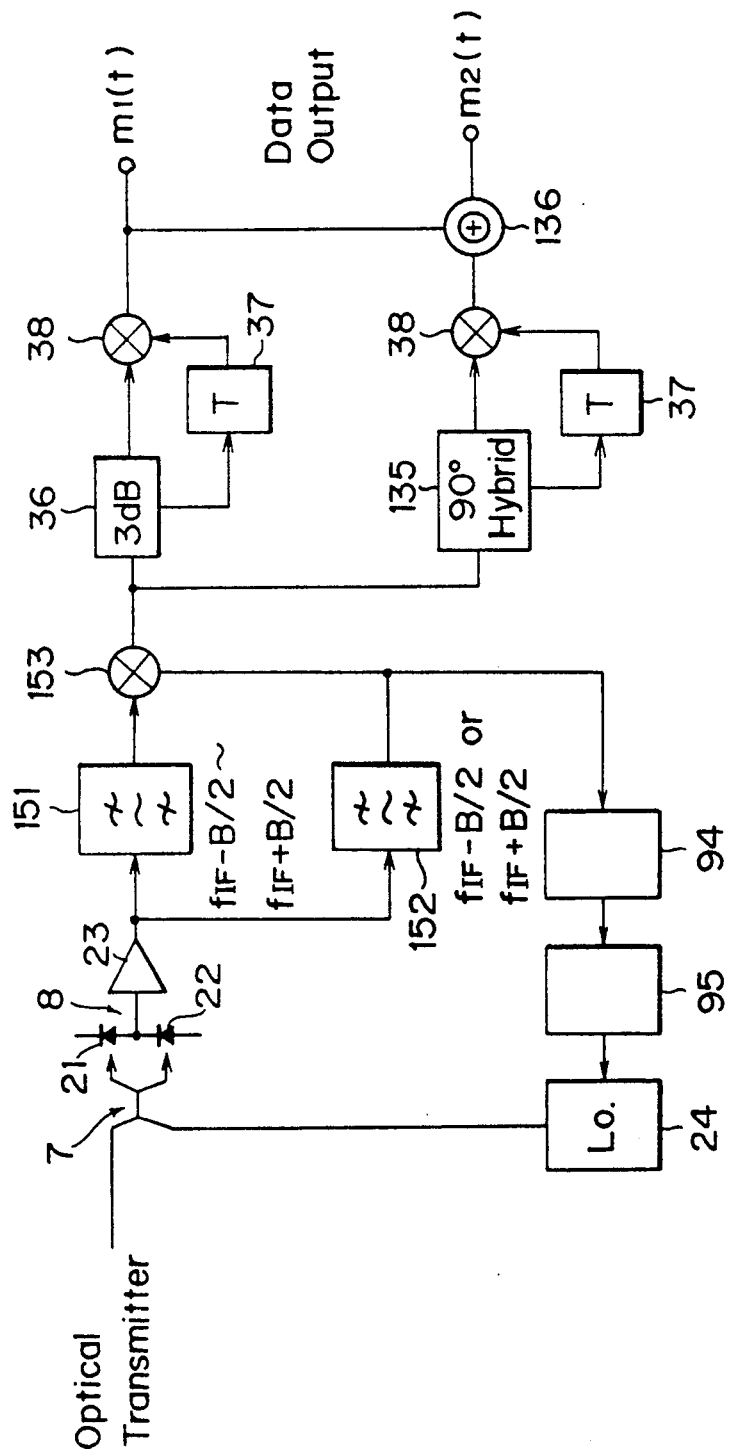
FIG. 25 is a block diagram of the DM-PSK transmission system representing an embodiment of phase noise suppression means in the case of four-valued modulation.
Figure 26:
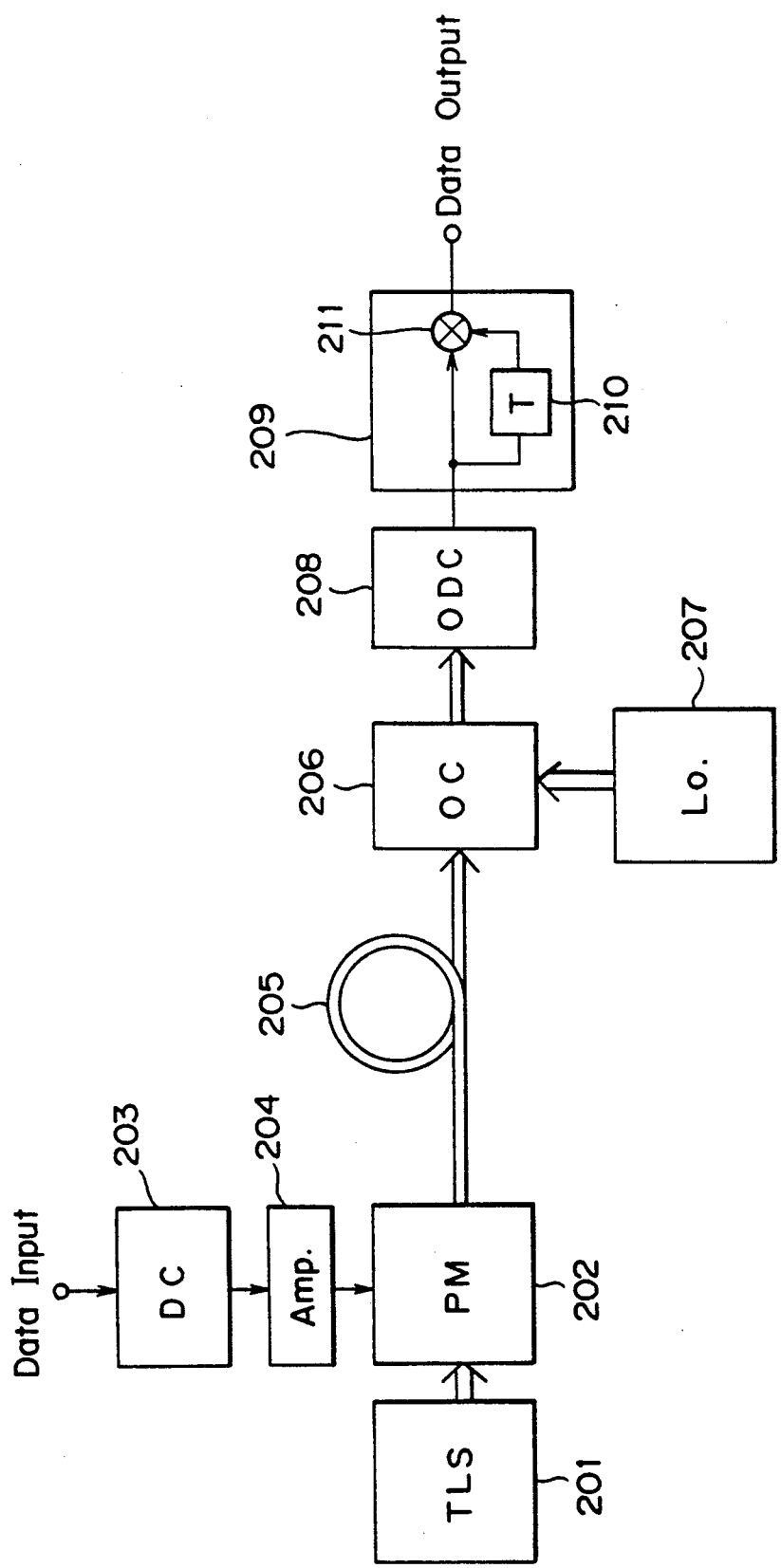
FIG. 26 (prior art) is a block diagram of a DPSK transmission system.
Figure 27:
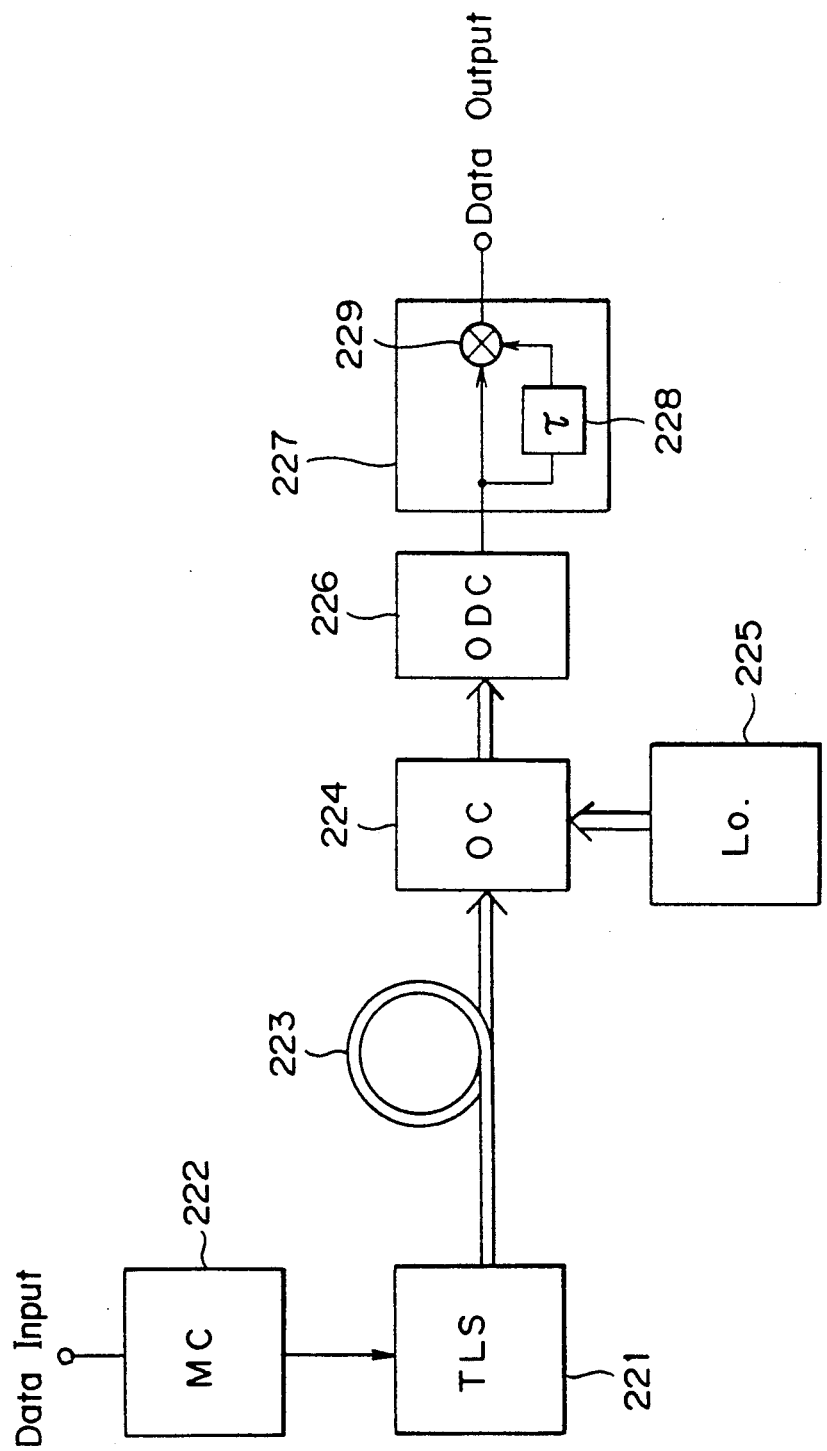
FIG. 27 (prior art) is a block diagram of a CPFSK transmission system.
Figure 28:
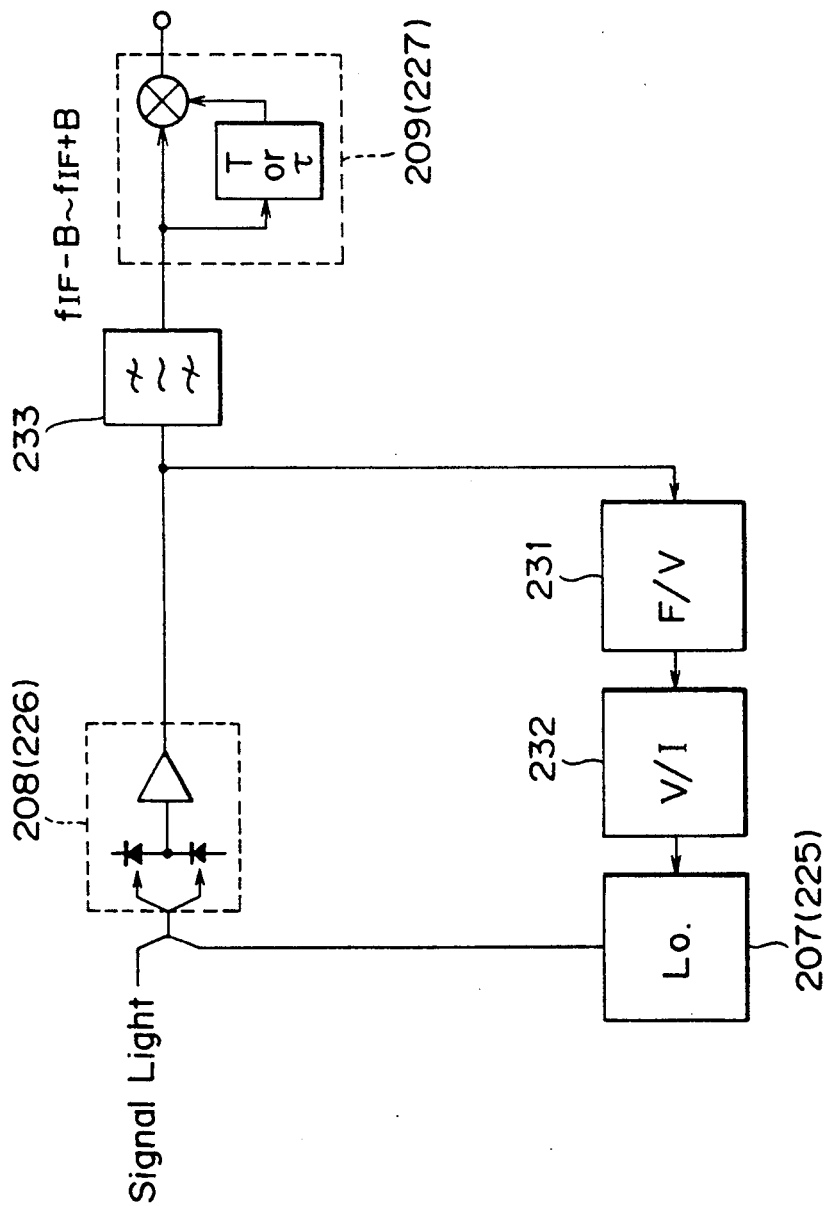
FIG. 28 (prior art) is an explanatory diagram of a general automatic frequency control means.
Figure 29:
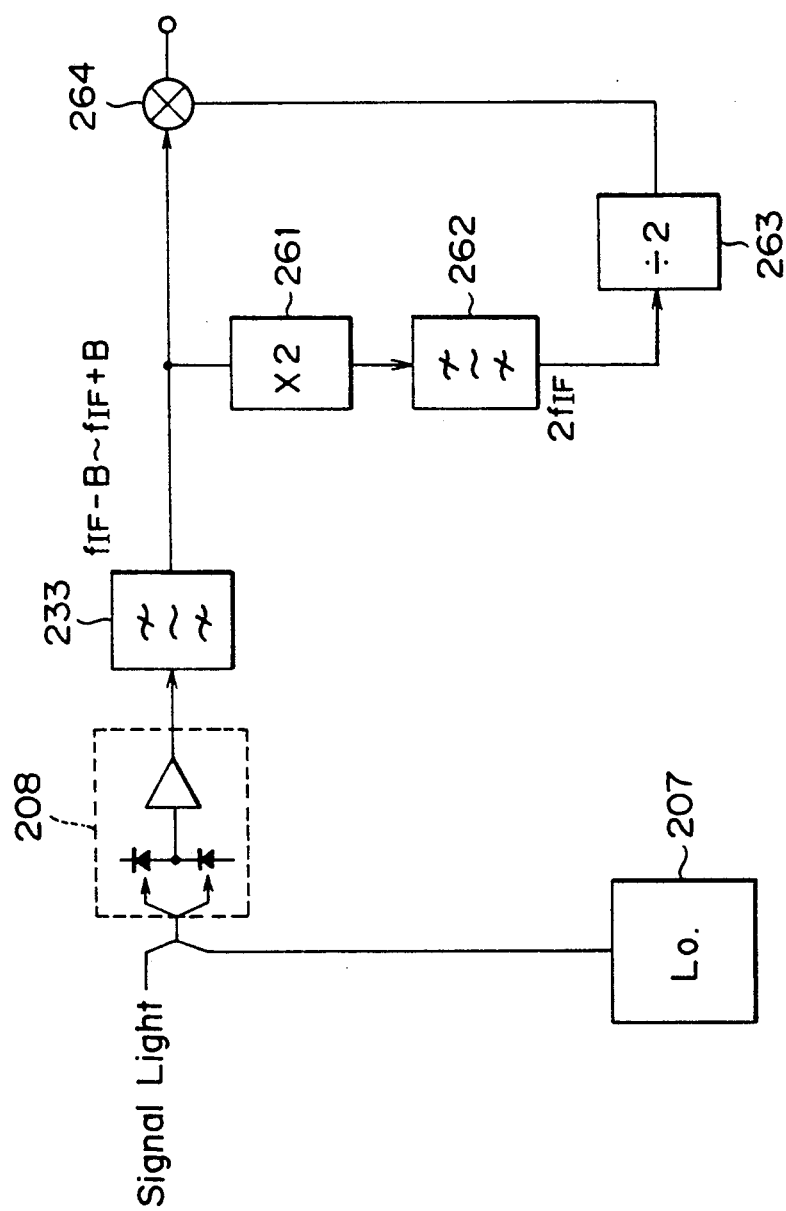
FIG. 29 (prior art) is an explanatory diagram of a general synchronous demodulation means.
Figure 30:
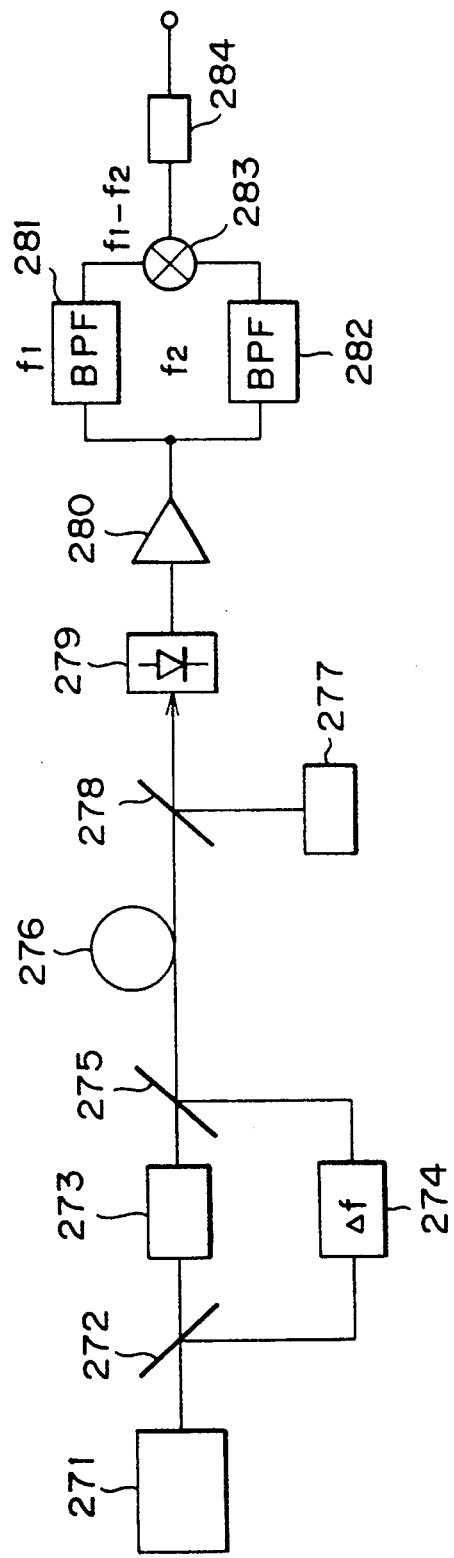
FIG. 30 (prior art) is an explanatory diagram of a general phase noise suppression means.
Figure 31:
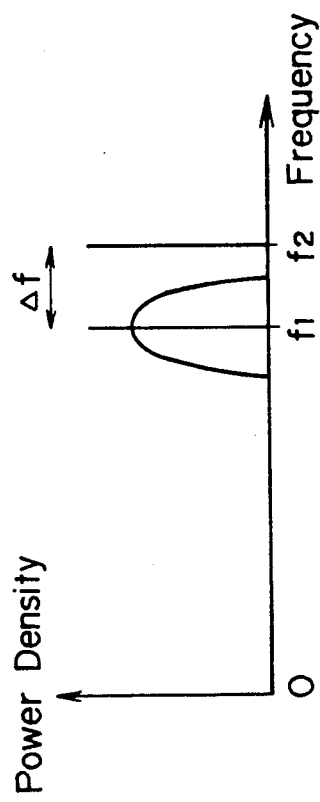
FIG. 31 (prior art) is an explanatory diagram of the spectrum of the signal input to each bandpass filter of FIG. 30.

FIG. 25 is a block diagram of the DM-PSK transmission system representing an embodiment of phase noise suppression means in the case of four-valued demodulation. What is different in this case from the case of the binary demodulation is that the passband of the bandpass filter 151 ranges from $f_{IF}-B/2$ to $f_{IF}+B/2$ and that the frequency of the signal which the narrow-band-pass filter 152 passes therethrough is $f_{IF}-B/2$ or $f_{IF}+B/2$. Output signals of the bandpass filter 151 and the narrow-band-pass filter 152 are mixed by the mixer 153 to be supplied to the demodulation circuit. The demodulation circuit is structured similarly to that in the system shown in FIG. 23. To perform automatic frequency control of the local oscillation LD 24, a branch signal is taken from the output signal of the narrow-band-pass filter 152 to be input to the frequency-to-voltage conversion circuit 94, and negative feedback control of the local oscillation LD 24 in accordance with the output of the frequency-to-voltage conversion circuit 94 is provided by the negative feedback circuit 95.

In the system shown in FIG. 25, the output signals of the bandpass filter 151 and the narrow-band-pass filter 152 with their frequencies not converted are input to the mixer 153, but either of these output signals may have its frequency converted before being input to the mixer 153 in the same way as in the system shown in FIG. 16, FIG. 18, or FIG. 20. Otherwise, both the output signals of the bandpass filter 151 and the narrow-band-pass filter 152 may have their frequencies converted before being input to the mixer 153.

According to the present invention as described in the foregoing, an effect can be obtained that highly precise synchronous automatic frequency control can be attained with the use of a simple structure. Here, it is also a large merit that the stability of the frequency does not depend on the mark-to-space ratio of the transmitted code.

Further, according to the present invention, synchronous demodulation can be achieved using a simple structure to thereby attain improvement in the reception sensitivity.

Further, according to the present invention, phase noise suppression can be achieved by a simple structure, and thereby, the allowance of the spectral line width exhibited by a light oscillating circuit such as a semiconductor laser can be enlarged.

In the foregoing, the present invention has been described as related to specific embodiments but the present invention is not limited to details of such embodiments. For example, a DM-PSK transmission system may be structured with two or all means for the above described automatic frequency control, demodulation, and phase noise suppression combined.

Thus, preferred embodiments described herein are given by way of illustration only and not limitative of the present invention. The scope of the invention is defined by the appended claims and all changes and modifications as fall within the equivalence of the scope of the claims are therefore to be embraced by the invention.

What is claimed is:

1. A direct modulation phase shift keying transmission system using a semiconductor laser, the semiconductor laser outputting light having a frequency varying in response to an injection current supplied to the semiconductor laser, the injection current being changed for a predetermined time period shorter than one time slot of an input signal coded by $2^n$-valued coding (n: a first natural number), and an integrated value of the frequency being varied according to the change in the injection current between a phase quantity of one of $2\pi k/2^n$ and $-2\pi k/2^n$ (k: a second natural number smaller than $2^n$), said direct modulation phase shift keying transmission system comprising:

first means for superposing a signal with a signal frequency corresponding to 1/n of a bit rate B of said input signal to the injection current supplied to said semiconductor laser and outputting a signal light; and second means for receiving the signal light, for detecting a line spectrum signal having a line frequency different from a center frequency $f_{IF}$ of an intermediate-frequency signal generated by optical-electrical conversion of said signal light with local light having a local frequency added to said signal light by the frequency corresponding to a rate B/n and for controlling the local frequency of said local light so that the line frequency of said line spectrum signal may become constant.

2. A direct modulation phase shift keying transmission system according to claim 1, wherein said first means includes an optical transmitter, and said second means includes an optical receiver connected to said optical transmitter via an optical transmission line transmitting the signal light output from said optical transmitter, and said first natural number n being a value of 1;

wherein said optical transmitter includes:

the semiconductor laser;

a bias current circuit, operatively connected to said semiconductor laser and supplying said semiconductor laser with a bias current;

a modulating current pulse circuit, operatively connected to said bias circuit and superposing a modulating current pulse having an amplitude with a pulse width smaller than the one time slot of the input signal coded by binary coding on said bias current;

a circuit, operatively connected to said bias circuit and superposing the signal with the signal frequency corresponding to the bit rate B of said input signal to said bias current; and an amplitude and pulse width controlling circuit, connected to said modulating current pulse circuit and responsive to said input signal controlling the amplitude and the pulse width of said modulating current pulse so that a modulated integrated value of a modulated frequency varied by said modulating current pulse circuit may become a modulated phase quantity of one of $\pi$ and $-\pi$; and wherein said optical receiver includes:

a local oscillation semiconductor laser outputting the local light;

an optical coupler, connected to said transmission line and said local oscillation semiconductor laser and adding together the signal light received from said optical transmitter and said local light and outputting a combined light;

an optical detecting circuit, connected to said optical coupler and subjecting the combined light received from said optical coupler to the optical-electrical conversion thereby generating the intermediate-frequency signal having an intermediate frequency;

a narrow-band-pass filter, connected to said optical detecting circuit and passing the line spectrum signal with the intermediate frequency of one of $f_{IF}-B$ and $f_{IF}+B$ of the intermediate-frequency signal received from said optical detecting circuit, where $f_{IF}$ represents the center frequency of said intermediate-frequency signal;

an oscillator oscillating at an oscillator frequency virtually equal to the intermediate frequency of said line spectrum signal and outputting an oscillator signal;

a mixer, connected to said oscillator and said narrow-band-pass filter and mixing the oscillator signal received from said oscillator and the line spectrum signal received from said narrow-band-pass filter and outputting a mixer output signal;

a low-pass filter, connected to said mixer and passing a lower frequency component of the mixer output signal received from said mixer and outputting a filter output signal; and a negative feedback circuit, connected to said low-pass filter and voltage-to-current converting the filter output signal received from said low-pass filter thereby providing said local oscillation semiconductor laser with negative feedback.

3. A direct modulation phase shift keying transmission system according to claim 1, wherein said first means includes an optical transmitter, and said second means includes an optical receiver connected to said optical transmitter via an optical transmission line transmitting the signal light output from said optical transmitter, and said first natural number n being a value of 1;

wherein said optical transmitter includes:

the semiconductor laser;

a bias current circuit, operatively connected to said semiconductor laser and supplying said semiconductor laser with a bias current;

a modulating current pulse circuit, operatively connected to said bias circuit and superposing a modulating current pulse having an amplitude with a pulse width smaller than the one time slot of the input signal coded by binary coding on said bias current;

a circuit, operatively connected to said bias circuit and superposing the signal with the signal frequency corresponding to the bit rate B of said input signal to said bias current; and an amplitude and pulse width controlling circuit, connected to said modulating current pulse circuit and responsive to said input signal controlling the amplitude and the pulse width of said modulating current pulse so that a modulated integrated value of a modulated frequency varied by said modulating current pulse circuit may become a modulated integrated value of a modulated frequency varied by said modulating current pulse circuit may become a modulated phase quantity of one of $\pi$ and $-\pi$; and wherein said optical receiver includes:

a local oscillation semiconductor laser outputting the local light;

an optical coupler, connected to said transmission line and said local oscillation semiconductor laser and adding together the signal light received from said optical transmitter and said local light and outputting a combined light;

an optical detecting circuit, connected to said optical coupler and subjecting the combined light received from said optical coupler to the optical-electrical conversion thereby generating the intermediate-frequency signal having an intermediate frequency;

a bandpass filter, connected to said optical detecting circuit and passing a filter signal with the intermediate frequency ranging from $f_{IF}-B$ to $f_{IF}+B$ of the intermediate-frequency signal received from said optical detecting circuit, where $f_{IF}$ represents the center frequency of said intermediate-frequency signal;

a demodulation circuit, connected to said bandpass filter and performing demodulation based on the filter signal received from said bandpass filter;

a first low-pass filter, connected to said optical detecting circuit and passing the line spectrum signal with the intermediate frequency $f_{IF}-B$ of the intermediate-frequency signal received from said optical detecting circuit;

an oscillator oscillating at an oscillator frequency $f_{IF}-B$ and outputting an oscillator signal;

a mixer, connected to said oscillator and mixing the oscillator signal received from said oscillator and the line spectrum signal received from said first low-pass filter and outputting a mixer output signal;

a second low-pass filter, connected to said mixer and passing a lower frequency component of the mixer output signal received from said mixer and outputting a filter output signal; and a negative feedback circuit, connected to said second low-pass filter and voltage-to-current converting the filter output signal received from said second low-pass filter thereby providing said local oscillation semiconductor laser with negative feedback.

4. A direct modulation phase shift keying transmission system according to claim 1, wherein said first means includes an optical transmitter, and said second means includes an optical receiver connected to said optical transmitter via an optical transmission line transmitting the signal light output from said optical transmitter, and said first natural number n being a value of 1;

wherein said optical transmitter includes:

the semiconductor laser;

a bias current circuit, operatively connected to said semiconductor laser and supplying said semiconductor laser with a bias current;

a modulating current pulse circuit, operatively connected to said bias circuit and superposing a modulating current pulse having an amplitude with a pulse width smaller than the one time slot of the input signal coded by binary coding on said bias current;

a circuit, operatively connected to said bias circuit and superposing the signal with the signal frequency corresponding to the bit rate B of said input signal to said bias current; and an amplitude and pulse width controlling circuit, connected to said modulating current pulse circuit and responsive to said input signal controlling the amplitude and the pulse width of said modulating current pulse so that a modulated integrated value of a modulated frequency varied by said modulating current pulse circuit may become a modulated phase quantity of one of $\pi$ and $-\pi$; and wherein said optical receiver includes:

a local oscillation semiconductor laser outputting the local light;

an optical coupler, connected to said transmission line and said local oscillation semiconductor laser and adding together the signal light received from said optical transmitter and said local light and outputting a combined light;

an optical detecting circuit, connected to said optical coupler and subjecting the combined light received from said optical coupler to the optical-electrical conversion thereby generating the intermediate-frequency signal having an intermediate frequency;

a bandpass filter, connected to said optical detecting circuit and passing a filter signal with the intermediate frequency ranging from $f_{IF}-B$ to $f_{IF}+B$ of the intermediate-frequency signal received from said optical detecting circuit, where $f_{IF}$ represents the center frequency of said intermediate-frequency signal;

a demodulation circuit connected to said band pass filter and performing demodulation based on the filter signal received from said bandpass filter;

a high-pass filter, connected to said optical detecting circuit and passing the line spectrum signal with the intermediate frequency $f_{IF}+B$ of the intermediate-frequency signal received from said optical detecting circuit;

an oscillator oscillating at an oscillator frequency $f_{IF}+B$ and outputting an oscillator signal;

a mixer, connected to said oscillator and mixing the oscillator signal received from said oscillator and the line spectrum signal received from said high-pass filter and outputting a mixer output;

a low-pass filter, connected to said mixer and passing a lower frequency component of the mixer output signal received from said mixer and outputting a filter output signal; and a negative feedback circuit, connected to said low-pass filter and voltage-to-current converting the filter output signal received from said low-pass filter thereby providing said local oscillation semiconductor laser with negative feedback.

5. A direct modulation phase shift keying transmission system using a semiconductor laser, the semiconductor laser outputting light having a frequency varying in response to an injection current supplied to the semiconductor laser, the injection current being changed for a predetermined time period shorter than one time slot of an input signal coded by binary coding, and an integrated value of the frequency being varied according to the change in the injection current between a phase quantity of one of $\pi$ and $-\pi$, said direct modulation phase shift keying transmission system comprising:

means for obtaining an intermediate-frequency signal by optical-electrical conversion of a signal light with local light having a local frequency added to said signal light, and for detecting a line spectrum signal having a line frequency generated when said intermediate-frequency signal is subjected to frequency conversion by a frequency doubler, and for controlling the local frequency of said local light so that the line frequency of said line spectrum signal may become constant.

6. a direct modulation phase shift keying transmission system according to claim 5, wherein said means includes an optical transmitter, and an optical receiver connected to said optical transmitter via an optical transmission line transmitting the signal light output from said optical transmitter;

wherein said optical transmitter includes:

the semiconductor laser;

a bias current circuit, operatively connected to said semiconductor laser and supplying said semiconductor laser with a bias current;

a modulating current pulse circuit, operatively connected to said bias circuit and superposing a modulating current pulse having an amplitude with a pulse width smaller than the one time slot of the input signal coded by binary coding on siad bias current; and an amplitude and pulse width controlling circuit, connected to said modulating current pulse circuit and responsive to said input signal controlling the amplitude and the pulse width of said modulating current pulse so that a modulated integrated value of a modulated frequency varied by said modulating current pulse circuit may become a modulated phase quantity of one of $\pi$ and $-\pi$; and wherein said optical receiver includes:
a local oscillation semiconductor laser outputting the local light;
an optical coupler, connected to said transmission line and said local oscillation semiconductive laser and adding together the signal light received from said optical transmitter and said local light and outputting a combined light;
an optical detecting circuit, connected to said optical coupler and subjecting the combined light received from said optical coupler to the optical-electrical conversion thereby generating the intermediate-frequency signal having an intermediate frequency;
a frequency doubler, connected to said optical detecting circuit and doubling the intermediate frequency of said intermediate-frequency signal received from said optical detecting circuit and outputting a double frequency signal;
a narrow-band-pass filter, connected to said optical detecting circuit and passing the line spectrum signal with the intermediate frequency of one of $2f_{IF}$, $2(f_{IF}+\Delta F)$, and $2(f_{IF}-\Delta F)$ of the double frequency signal received from said frequency doubler circuit, where $f_{IF}$ represents a center frequency of said intermediate-frequency signal and $\Delta F$ represents a frequency shift due to a change in said injection current in said optical transmitter; and
a controlling circuit, connected to said narrow-band-pass filter and controlling the injection current supplied to said local oscillation semiconductor laser so that the intermediate frequency of the line spectrum signal received from said narrow-band-pass filter may become constant.

7. A direct modulation phase shift keying transmission system according to claim 5,
wherein said means includes an optical transmitter, an optical receiver connected to said optical transmitter via an optical transmission line transmitting the signal light output from said optical transmitter;
wherein said optical transmitter includes:
the semiconductor laser;
a bias current circuit, operatively connected to said semiconductor laser and supplying said semiconductor laser with a bias current;
a modulating current pulse circuit, operatively connected to said bias circuit and superposing a modulating current pulse having an amplitude with a pulse width smaller than the one time slot of the input signal coded by binary coding on said bias current; and
an amplitude and pulse width controlling circuit, connected to said modulating current pulse circuit and responsive to said input signal controlling the amplitude and the pulse width of a modulating current pulse so that a modulated integrated value of the frequency varied by said modulating current pulse circuit may become a modulated phase quantity of one of $\pi$ and $-\pi$; and wherein said optical receiver includes:
a local oscillation semiconductor laser outputting the local light;
an optical coupler, connected to said transmission line and said local oscillation semiconductor laser and adding together the signal light received from said optical transmitter and said local light and outputting a combined light;
an optical detecting circuit, connected to said optical coupler and subjecting the combined light received from said optical coupler to the optical-electrical conversion thereby generating the intermediate-frequency signal having an intermediate frequency;
a frequency doubler, connected to said optical detecting circuit and doubling the intermediate frequency of said intermediate-frequency signal received from said optical detecting circuit and outputting a double frequency signal;
a narrow-band-pass filter, connected to said optical detecting circuit and passing the line spectrum signal with the intermediate frequency of one of $2f_{IF}$, $2(f_{IF}+\Delta F)$, and $2(f_{IF}-\Delta F)$ of the double frequency signal received from said frequency doubler circuit, where $f_{IF}$ represents a center frequency of said intermediate-frequency signal and $\Delta F$ represents a frequency shift due to a change in said injection current in said optical transmitter;
an oscillator, connected to said narrow-band-pass filter and oscillating at an oscillator frequency virtually equal to the intermediate frequency of the line spectrum signal received from said narrow-band-pass filter and outputting an oscillator signal;
a mixer, connected to said oscillator and mixing the oscillator signal received from said oscillator and the line spectrum signal received from said narrow-band-pass filter and outputting a mixer output signal;
a low-pass filter, connected to said mixer and passing a lower frequency component of the mixer output signal received from said mixer and outputting a filter output signal; and
a negative feedback circuit, connected to said low-pass filter and voltage-to-current converting the filter output signal received from said low-pass filter thereby providing said local oscillation semiconductor laser with negative feedback.

8. A direct modulation phase shift keying transmission system using a semiconductor laser, the semiconductor laser outputting light having a frequency varying in response to an injection current supplied to the semiconductor laser, the injection current being changed for a predetermined time period shorter than one time slot of an input signal coded by $2^n$-valued coding (n: a first natural number), and an integrated value of the frequency being varied according to the change in the injection current between a phase quantity of one of $2\pi k/2^n$ and $-2\pi k/2^n$ (k: a second natural number smaller than $2^n$), said direct modulation phase shift keying transmission system comprising:
first means for superposing a signal with a signal frequency corresponding to 1/n of a bit rate B of said input signal to the injection current supplied to said semiconductor laser and outputting a signal light; and second means for receiving the signal light, for setting a local frequency of a local light so that a center frequency $f_{IF}$ of an intermediate-frequency signal generated by optical-electrical conversion of said signal light with the local light added to said signal light may become approximately 2/n times the signal frequency corresponding to said bit rate B and for detecting a line spectrum signal having a line frequency different from said center frequency $f_{IF}$ by the frequency corresponding to a rate B/n, thereby regenerating a carrier in accordance with said line spectrum signal, and mixing the signal based on said carrier and said intermediate-frequency signal thereby achieving synchronous demodulation.

9. A direct modulation phase shift keying transmission system according to claim 8,
wherein said first means includes an optical transmitter, and said second means includes an optical receiver connected to said optical transmitter via an optical transmission line transmitting the signal light output from said optical transmitter, and said first natural number n being a value of 1;
wherein said optical transmitter includes:
the semiconductor laser;
a bias current circuit, operatively connected to said semiconductor laser and supplying said semiconductor laser with a bias current;
a modulating current pulse circuit operatively connected to said bias circuit and superposing a modulating current pulse having an amplitude with a pulse width smaller than the one time slot of the input signal coded by binary coding on said bias current;
a circuit, operatively connected to said bias circuit and superposing the signal with the signal frequency corresponding to the bit rate B of said input signal to said bias current; and
an amplitude and pulse width controlling circuit, connected to said modulating current pulse circuit and responsive to said input signal controlling the amplitude and the pulse width of said modulating current pulse so that a modulated integrated value of a modulated frequency varied by said modulating current pulse circuit may become a modulated phase quantity of one of $\pi$ and $-\pi$; and
wherein said optical receiver includes:
a local oscillation semiconductor laser outputting the local light;
an optical coupler, connected to said transmission line and said local oscillation semiconductor laser and adding together the signal light received from said optical transmitter and said local light and outputting a combined light;
an optical detecting circuit, connected to said optical coupler and subjecting the combined light received from said optical coupler to the optical-electrical conversion thereby generating the intermediate-frequency signal having an intermediate frequency;
a bandpass filter, connected to said optical detecting circuit and passing a filter signal with the intermediate frequency ranging from $f_{IF}-B$ to $f_{IF}+B$ of the intermediate-frequency signal received from said optical detecting circuit, where $f_{IF}$ represents the center frequency of said intermediate-frequency signal;

a narrow-band-pass filter, connected to said optical detecting circuit and passing the line spectrum signal with the intermediate frequency $f_{IF}-B$ of the intermediate-frequency signal received from said optical detecting circuit;
a frequency doubler, connected to said narrow-band-pass filter and doubling the intermediate frequency of the line spectrum signal received from said narrow-band-pass filter and outputting a double frequency signal; and
a mixer, connected to said bandpass filter and mixing the filter signal received from said bandpass filter and the double frequency signal received from said frequency doubler and outputting a mixer signal.

10. A direct modulation phase shift keying transmission system according to claim 9, wherein said optical transmitter includes a precoder, connected to said amplitude and pulse width controlling circuit and performing converse coding of differential coding to the input signal forming a coded input signal, and transmitting the coded input signal to said amplitude and pulse width controlling circuit.

11. A direct modulation phase shift keying transmission system according to claim 9, wherein said optical receiver includes a postcoder, connected to said mixer and performing converse coding of differential coding on said mixer signal received from said mixer.

12. A direct modulation phase shift keying transmission system using a semiconductor laser, the semiconductor laser outputting light having a frequency varying in response to an injection current supplied to the semiconductor laser, the injection current being changed for a predetermined time period shorter than one time slot of an input signal coded by $2^n$-valued coding (n: a first natural number), and an integrated value of the frequency being varied according to the change in the injection current between a phase quantity of one of $2\pi k/2^n$ and $-2\pi k/2^n$ (k: a second natural number smaller than $2^n$), said direct modulation phase shift keying transmission system comprising:
first means for superposing a signal with a signal frequency corresponding to 1/n of bit rate B of said input signal to the injection current supplied to said semiconductor laser and outputting a signal light; and
second means for receiving the signal light, for detecting a line spectrum signal having a line frequency different from a center frequency $f_{IF}$ of an intermediate-frequency signal having an intermediate frequency generated by optical-electrical conversion of said signal light with local light having a local frequency added to said signal light by the frequency corresponding to a rate B/n, and for one of mixing said line spectrum signal and said intermediate-frequency signal and mixing said line spectrum signal and said intermediate-frequency signal after converting one of said line frequency, said intermediate frequency, and both of said line and intermediate frequencies, thereby achieving demodulation.

13. A direct modulation phase shift keying transmission system according to claim 12,
wherein said first means includes an optical transmitter, and said second means includes an optical receiver connected to the optical transmitter via an optical transmission line transmitting the signal light output from said optical transmitter, and said first natural number n being a value of 1;

wherein said optical transmitter includes:

the semiconductor laser;

a bias current circuit, operatively connected to said semiconductor laser and supplying said semiconductor laser with a bias current;

a modulating current pulse circuit operatively connected to said bias circuit and superposing a modulating current pulse having an amplitude with a pulse width smaller than the one time slot of the input signal coded by binary coding on said bias current;

a circuit, operatively connected to said bias circuit and superposing the signal with the signal frequency corresponding to the bit rate B of said input signal to said bias current; and an amplitude and pulse width controlling circuit, connected to said modulating current pulse circuit and responsive to said input signal controlling the amplitude and the pulse width of said modulating current pulse so that a modulated integrated value of a modulated frequency varied by said modulating current pulse circuit may become a modulated phase quantity of one of $\pi$ and $-\pi$; and wherein said optical receiver includes:

a local oscillation semiconductor laser outputting the local light;

an optical coupler, connected to said transmission line and said local oscillation semiconductor laser and adding together the signal light received from said optical transmitter and said local light and outputting a combined light;

an optical detecting circuit, connected to said optical coupler and subjecting the combined light received from said optical coupler to the optical-electrical conversion thereby generating the intermediate-frequency signal;

a bandpass filter, connected to said optical detecting circuit and passing a filter signal with the intermediate frequency ranging from $f_{IF}-B$ to $f_{IF}+B$ of the intermediate-frequency signal received from said optical detecting circuit, where $f_{IF}$ represents the center frequency of said intermediate-frequency signal;

a narrow-band-pass filter, connected to said optical detecting circuit and passing the line spectrum signal with the intermediate frequency of one of $f_{IF}-B$ and $f_{IF}+B$ of the intermediate-frequency signal received from said optical detecting circuit;

a mixer, connected to said bandpass filter and mixing the filter signal received from said bandpass filter and the line spectrum signal received from said narrow-band-pass filter and outputting a mixer signal; and a demodulation circuit, connected to said mixer and performing demodulation based on the mixer signal received from said mixer.

14. A direct modulation phase shift keying transmission system according to claim 13, wherein the line spectrum signal passed from said narrow-band-pass filter is input to said mixer after being one of upconverted and downconverted.

15. A direct modulation phase shift keying transmission system according to claim 13, wherein the filter signal passed from said bandpass filter is input to said mixer after being one of upconverted and downconverted.

16. A direct modulation phase shift keying transmission system according to claim 14, wherein the filter signal passed from said bandpass filter is input to said mixer after being one of upconverted and downconverted.

17. A direct modulation phase shift keying transmission system including a semiconductor laser being supplied with an injection current, comprising:

a circuit, operatively connected to the semiconductor laser generating the injection current; and first means, operatively connected to said circuit, for superposing a signal having a frequency equal to a bit rate B with the injection current received from said circuit producing a line spectrum signal having a line frequency; and second means, operatively connected to said first means, for receiving the line spectrum signal from said first means, and for controlling the line frequency of the line spectrum signal to be constant.

* * * * *